(12) United States Patent
Correa et al.

(10) Patent No.: US 8,132,535 B2
(45) Date of Patent: Mar. 13, 2012

(54) METHOD AND APPARATUS FOR REDUCTION OF AMMONIA, CARBON DIOXIDE AND PATHOGENS IN CHICKEN HOUSES

(75) Inventors: Rafael S. Correa, Salisbury, MD (US); Mark A. Dekich, Salisbury, MD (US); William D. Samson, Salisbury, MD (US); Erich F. Bevensee, Eden, MD (US)

(73) Assignee: Avihome, LLC, Salisbury, MD (US)

( * ) Notice: Subject to any disclaimer, the term of this patent is extended or adjusted under 35 U.S.C. 154(b) by 658 days.

(21) Appl. No.: 11/475,236

(22) Filed: Jun. 27, 2006

(65) Prior Publication Data
US 2007/0006815 A1 Jan. 11, 2007

Related U.S. Application Data

(60) Provisional application No. 60/693,797, filed on Jun. 27, 2005.

(51) Int. Cl.
*A01K 31/18* (2006.01)
*A01K 1/01* (2006.01)
(52) U.S. Cl. .......................... 119/437; 119/448; 119/450
(58) Field of Classification Search .................. 119/436, 119/437, 444, 447, 448, 525–530; 52/126.3, 52/263, 220.3, 126.6, 126.1
See application file for complete search history.

(56) References Cited

U.S. PATENT DOCUMENTS

| | | | | |
|---|---|---|---|---|
| 1,483,157 | A | * | 2/1924 | Chabbert .......................... 4/455 |
| 1,817,384 | A | * | 8/1931 | Lewis et al. .................... 454/236 |
| 3,951,336 | A | | 4/1976 | Miller et al. |
| 5,666,905 | A | * | 9/1997 | Mackin et al. ................. 119/448 |
| 5,758,462 | A | * | 6/1998 | Finn .............................. 52/302.1 |
| 6,047,663 | A | * | 4/2000 | Moreau et al. ................. 119/529 |
| 6,321,687 | B1 | * | 11/2001 | Lemmon et al. ............... 119/448 |
| 6,370,831 | B1 | * | 4/2002 | Marshall et al. ................ 52/263 |
| 6,854,278 | B2 | | 2/2005 | Maisotsenko |

(Continued)

FOREIGN PATENT DOCUMENTS

DE 296 14 928 U1 2/1998

(Continued)

OTHER PUBLICATIONS

Solid Sidewalls for Broiler Houses, The Alabama Poultry Engineering and Economics Newsletter, No. 12 Jul. 2001.

(Continued)

*Primary Examiner* — Son T Nguyen
(74) *Attorney, Agent, or Firm* — Jacobson Holman PLLC

(57) ABSTRACT

A chicken or fowl grow out facility utilizes a ventilated floor assembly including a ventilated floor through which liquid and gas can flow, but which retains manure deposited thereon, and a closed bottom floor plenum underneath the ventilated floor, which includes a liquid and vapor barrier covering the ground surface. Blowers in an attic plenum can discharge warm air through hanging pleated conduit tubes into the floor plenum to provide heat through the ventilated floor. A plurality of indirect evaporative coolers and associated air blowers in the facility walls force outside air, cooled or uncooled, into the growth facility, and create higher pressure in the growth facility than the pressure in the floor plenum. Vacuum blowers associated with the floor plenum cause the flow of air and air-borne contaminates through the floor and exhaust same from the plenum to outside the facility which dries manure on the floor and reduces ammonia formation and pathogen growth. A movable power-driven pusher wall pushes the marketing age fowl onto a conveyor for harvesting.

32 Claims, 16 Drawing Sheets

U.S. PATENT DOCUMENTS

2004/0079040 A1* 4/2004 MacLean et al. ............ 52/302.1
2005/0028747 A1* 2/2005 Romeu Guardia ............ 119/448

FOREIGN PATENT DOCUMENTS

| | | | |
|---|---|---|---|
| EP | 294909 | A1 * | 12/1988 |
| NL | 8902177 | | 3/1991 |
| NL | 9201642 | | 4/1994 |
| NL | 1002852 | C | 10/1997 |

OTHER PUBLICATIONS

Ammonia: Can Cause Serious Losses Even When You Can't Smell It, The Poultry Engineering, Economics & Management Newsletter, No. 19, Sep. 2002.

Ammonia Emissions Update, Paul H. Patterson, Penn State Univ., pp. 36-42, date unknown.

Auburn University—Poultry Ventilation & Housing (online Feb. 23, 2005).

DURA-SLAT advertisement, WATT PoultryUSA, Dec. 2004.

Atlantis Variable Loads Resistance Component Assembly, undated.

How the Coolerado Cooler Works, Coolerado, online Apr. 26, 2005.

Pros and Cons of In-House Litter Treatments, Current Concepts In Broiler Production, Winter 1999.

Article on controlling ammonia, Jim Donald et al, Auburn Univ., Undated.

* cited by examiner

METHOD AND APPARATUS FOR REDUCTION OF AMMONIA, CARBON DIOXIDE AND PATHOGENS IN CHICKEN HOUSES

RELATED APPLICATION

This application is entitled to and hereby claims the priority of U.S. provisional application Ser. No. 60/693,797, filed Jun. 27, 2005.

BACKGROUND OF THE INVENTION

1. Field of Invention

The present invention relates generally to improvements in new and existing chicken house structures and methods of operation which reduce air-borne contaminants, such as ammonia ($NH_3$), methane ($CH_4$), carbon dioxide ($CO_2$) and hydrogen sulfide ($H_2S$), emissions and pathogens including, but not limited to, *salmonella, E-coli, coccidiosis*, other bacteria strains and fungus/mold development, while concurrently improving carbon dioxide removal, meat bird performance, chicken manure removal, chick brooding and overall chicken welfare during the growing process.

The present invention also relates to chicken house structures and methods to integrate the raising of baby chicks (the first two weeks of growth) with the growth after the first two weeks in order to improve overall chicken production.

2. Background Information

The chicken growing industry is based on mass production and low margin in which production casualties or weight reduction that might be considered trivial in other commercial activities can be detrimental to production cost. The magnitude of the industry is evident from the fact that a typical chicken house (approximately 40 to 60 feet×500 to 600 feet) will house 25,000 to 45,000 birds per flock. At harvest time, a typical commercial chicken house can have a density of 0.8 square feet per chicken or 7.5 lbs/square foot. Each bird will have consumed an average of 1.8 lbs. of feed per pound of chicken and an average of 2.25 gallons of water per pound of chicken by harvest time. Forty percent of the feed and water is consumed during the last week of growth. Broilers are grown to an average of 5.5 lbs. and roasters to an average of 7.25 lbs. The total amount of manure deposited on the floor bedding during each growth cycle is approximately 150,000 lbs. The total amount of excreted water is approximately 50,000 gallons, which makes it impossible to achieve and/or maintain bedding dryness under existing chicken house conditions.

Wet manure and saturated bedding, along with the massive animal heat generated by so many birds, results in perfect environmental conditions for bacteria and fungus development. Unfortunately, the widespread use of evaporative coolers for reducing the temperature can be counterproductive in that it results in high humidity, which is also conducive to ammonia and pathogen production. As the bacteria feeds on the manure and multiplies, it produces large amounts of ammonia gas, as well as methane gas. Uric acid breakdown accounts for 60% to 75% of the ammonia and $CO_2$ emissions. The use of ventilation systems for removing ammonia and other gasses is not a satisfactory solution since such use can have undesirable results such as the introduction of cold air into the facility during cold weather with minimal ventilation.

One of the main problems resulting from high levels of ammonia in the chicken house is a wider variation in the uniformity of the flock. The percentage of small chickens can be as high as ten percent (10%) or more, and such birds cannot recover from growth deprivation early in their life cycle due to the fact that they cannot compete for or reach the water and feeder systems, which are at an elevation to accommodate normal-sized birds in the flock. Another problem resulting from high ammonia levels is increased susceptibility to disease producing pathogens including, but not limited to, *E-coli* infection, infectious bronchitis, and New Castle Disease.

Research has demonstrated that ammonia levels at or above 50 ppm (parts per million) inhibit bird growth, creating a degree of weight loss in all of the birds, not just the stunted chickens. Such weight loss can be as much as a half-pound per bird during a typical seven-week growth period. In fact, ammonia levels as low as 25 ppm have been shown to diminish bird growth. High ammonia levels also create physical defects such as blindness in the birds. Needless to say, a reduction in the number and size of marketable birds in a flock can be significantly detrimental to production cost. Moreover, the financial damage to the producer resultant from the loss of mature birds goes beyond the lost sales due to the previously incurred cost of feeding the chickens.

As stated previously, decomposition of the uric acid contributes 60% to 75% of the ammonia emissions in the chicken house, and large amounts of growth-inhibiting carbon dioxide are also produced. The carbon dioxide is 50% heavier than air and collects in a layer which remains near the floor of the facility affecting the bird level environment. Moreover, the carbon dioxide is difficult to remove due to the fact that the exhaust ports in conventional facilities are typically located in elevated positions well above the carbon dioxide layer. Also, the density of the chickens in the chicken house reduces the ability to effect flushing of the carbon dioxide from the facility since the chickens occupy the same space on the floor of the facility as the carbon dioxide. The carbon dioxide gas concentration is also greater during the last week of growth because the chickens consume approximately 40% of their total feed and water requirements during this time period as they are achieving their genetic potential for growth. The size of the chickens as well as their high concentration per sq. ft. of floor space consequently makes it very difficult to properly flush carbon dioxide and any other gas trapped between and under the chickens.

At chicken harvesting collection time the bedding is saturated with wet manure, making it the perfect environment for high ammonia levels, *salmonella, E-coli, coccidiosis*, multiple bacteria strains, fungus/mold and other pathogens to develop and multiply. This problem is exasperated at collection time due to the fact that the feed and water lines are lifted to a high elevation out of reach of the chickens in preparation for the collection procedure. The chickens consequently then naturally feed from the contaminated bedding with the result frequently being significant contamination of the chickens by potential food borne pathogens, i.e., *salmonella, E-coli*, and *campylobacter*.

Detection of ammonia would obviously permit steps to be taken in an effort to reduce the ammonia level; however, such steps are frequently not taken because many producers are unaware of low, but harmful, ammonia levels in their facilities. Such unawareness is due to the fact that the human nose loses olfactory sensitivity to ammonia after repeated or long-term exposure and the growers become incapable of detecting ammonia levels of 50 ppm or lower due to such deterioration. Controlled experiments have shown that 50 ppm ammonia will cause a half-pound weight loss in a typical seven-week broiler growth period.

Hazards and additional grower expense arising from ammonia and other air-borne contaminants present in poultry growth facilities are not limited to poultry since such contaminants also create substantial health hazards for workers in such facilities including coughing, eye-irritation, dyspnea, headaches, fatigue and behavioral changes resulting in lost work-days and increased health and insurance costs to the producer.

DESCRIPTION OF PRIOR TECHNOLOGY

It has been the practice of the poultry industry to require producers to meet certain minimal chicken house conditions. These requirements include providing a compacted dirt floor. Over this dirt floor, three (3) inches of bedding (wood chips, sawdust, straw, chopped cardboard, etc., sometimes referred to as "litter") are required. The intended purpose of this bedding litter is to provide insulation from the ground and to have the capacity to absorb moisture from the chicken manure.

Another requirement for producers is to provide ventilation capable of changing the total air in the chicken house once per minute during warm weather (tunnel ventilation) and to provide minimum ventilation capable of changing the total air by cross ventilation every 6 to 8 minutes in cold weather, in addition to maintaining a required temperature, water and forage. Such ventilation requirements are not energy efficient.

Conventional chicken house design and ventilation technology in use today consist of tunnel ventilation in warm weather and minimal cross ventilation in cold weather, neither procedure conforming with EPA ammonia emission and OSHA human exposure standards. The humidity retained in the litter, along with the undigested feed and uric acid found in chicken manure, creates a uniquely productive environment for the development of ammonia, carbon dioxide, hydrogen sulfide, methane, bacteria and fungus/mold. The present invention is directed to apparatus and methods for alleviating the foregoing problems.

Tunnel or laminar ventilation of conventional chicken houses in warm weather is provided by a series of exhaust fans located at one end of the elongated chicken house that pulls air through the length of the house (exhaust). On the opposite end of the elongated chicken house, ambient air is pulled through cold water saturated cooling pads (intake) that cool and saturate the air which then travels along the length of the chicken house and is exhausted by the exhaust fans.

Although the tunnel ventilation system of water-saturated air will create the sensation of lower temperatures in most animals, it is not effective for cooling chickens due to the fact that they do not perspire. Moreover, their feathers insulate their skin so that the effects of water-saturated airflow can actually be adverse to them because the chickens' natural method of cooling is by panting. Panting is pulling ambient temperature air into the chickens' lungs and airsacs to absorb body heat and expel this warmer air. Their ability to effectively cool themselves by panting is greatly hampered when the air is already saturated with moisture prior to inhalation. This condition forces the chickens to pant for prolonged periods of time during which they are burning calories due to breast muscular activity and not eating or drinking, thereby negatively affecting their growth.

The above-described tunnel ventilation cooling method suffers from additional shortcomings due to the inability of the moisture-saturated air to absorb additional moisture from the bedding. As the bedding becomes saturated with water and manure, and with the lack of natural light, substantial heat is generated by the bedding thus raising the temperature surrounding the chickens. An environment is thus created for multiplying bacteria and fungus/molds. Moreover, the water-saturated air enhances uric acid decomposition and resultant carbon dioxide and ammonia, as well as methane, emissions. The additional water in the saturated air also increases bacterial production of ammonia in the litter.

Another problem with conventional tunnel ventilation is that it causes the chickens to migrate toward the incoming air seeking fresh oxygenated air, packing themselves in tightly on the air intake end, and causing injuries and bruises. This migration also increases the concentration of manure in this area and also reduces the area for natural water absorption by the bedding, since the chickens defecate in a reduced floor area, which prevents the bedding from evaporating the liquid and precludes bedding drying.

Tunnel ventilation is additionally ineffective for removing the heavy carbon dioxide gas produced by the chickens' normal breathing cycle, as well as the decomposition of the uric acid which is concentrated in the lower portion of the chicken house near the bedding where it is shielded by the chickens.

An alternative is to use air-scrubbers, which are typically installed at the air exhaust end of the chicken house for removing ammonia and other gas emissions. Although proven in other industries, this technology is very costly and requires high maintenance and substantial energy consumption. Moreover, the air-scrubbers have no effect on *salmonella, E-coli, coccidiosis*, multiple bacteria strains and fungus/mold contamination, and the scrubbers provide no advantages which improve the chickens' welfare.

Chicken collection for marketing in today's chicken houses is done manually, or with mechanized catching equipment to a small degree. The manual method consists of several workers (chicken catchers) that chase, catch and hold the birds by their feet. By placing one chicken leg between each finger until they have a hand-full, the chickens are then placed in a cage at a prescribed number. When the cage is full, it is picked up by a forklift and loaded onto a truck for transportation to the processing plant. The mechanized method consists of a self-propelled or motorized vehicle, equipped with a conveyor to carry the chickens out in order to later manually place them in the cage. At the entrance of the conveyor there are two inwardly rotating wheels/brushes; some with rubber fingers, others use plastic materials to pull the chicken onto the conveyor, while simultaneously workers are corralling the chickens toward the conveyor entrance of the machine.

The present collection procedures are expensive and create several undesirable problems. In the case of the manual system, labor is a major issue due to both its availability and cost. The process is stressful for the chickens, with bones being broken and the chickens bruised, thereby reducing product value. The mechanized method requires expensive equipment and also stresses and injures too large a percentage of the chickens. Another substantial problem arises from the fact that the forklift vehicles and the catching machine both go from chicken house to chicken house, thus resulting in the spread of pathogens and diseases among the chicken farms. Bio-security of people and equipment is a serious problem.

During the chicks first two weeks, the environment as well as the temperature is important in order to achieve full genetic potential. Improper brooding is one of the most common causes of stress in poultry production.

There is a large body of information available with the recommended brooding temperatures during this critical time. All these recommendations are made with the assumption that the starting point is clean dry bedding. The bedding materials used today are absolvent and not able to dry during chicken house down time (typically 13 days) as the manure blocks any ventilation that would be necessary to accomplish this process. As the chicken house is prepared for brooding the temperature is raised above 95° F. Not only is this extremely energy inefficient, but it causes the evaporation of the urine retained by the bedding of the previous flock. This chemical reaction produces large amounts of ammonia gas as well as carbon dioxide. Although the house is at 95° F., the evaporation at floor level where the baby chicks are placed creates a cooling effect. The $CO_2$ gases are 50% heavier than air. This creates a very poor environment for the baby chicks as their needs are warmth and fresh or properly oxygenated air.

SUMMARY OF THE INVENTION

In order to overcome the technical problems of existing chicken houses and the established inefficient operating procedures currently being followed, the present invention provides apparatus and methods which avoid the use of bedding and which provide for better control of ventilation, temperature and humidity. The apparatus and method of the present invention act to remove the water and moisture from the manure deposited on the floor so as to reduce ammonia formation, and perhaps methane formation, as well as reduce *salmonella, E-coli, coccidiosis*, multiple bacteria strains and fungus/mold growth. The manure and chicken house floor are kept dry. If air-borne contaminants are generated, they are effectively removed from the chicken house and exhausted to the outside. The present invention also improves chicken genetic performance potential, uniformity and provides improved harvesting of mature birds at collection time.

The present invention can be effected in either a new chicken house or retrofitted into any existing chicken house. The chicken house of this invention has a poultry growth or grow out chamber enclosed by a ceiling, a front wall, a rear wall, a right side wall, a left side wall and a multiple component floor assembly which provides a ventilated floor assembly. The floor assembly has a ventilated floor component, such as a geotextile carpet or flat molded plastic sections with small ventilation openings set side-by-side, through which air and liquid can easily flow but retains all solids on its upper surface. The ventilated floor extends wall-to-wall over the entire growth chamber for supporting the chickens thereon. Spaced below the ventilated floor is a bottom component made of water and vapor impermeable material, such as polyethylene sheeting or the like, which prevents any water or other liquid or gasses from escaping and/or entering into the ground underneath the chicken house.

Spaced between the ventilated floor and the impermeable barrier are a plurality of side-by-side ventilated plastic modules which support the ventilated floor and with the impermeable membrane form a closed bottom floor plenum underneath the lower surface of the geotextile carpet (or other ventilated floor component). The floor plenum can be maintained at sub-atmospheric pressure by one or more exhaust fans which create a pressure differential between the growth chamber and the floor plenum that is conducive to downward air flow from the growth chamber through the geotextile carpet component or ventilated floor component and manure thereon and into the floor plenum. The exhaust fans then exhaust the air, moisture and air-borne contaminants drawn into the floor plenum to the outside.

In one preferred embodiment, the impermeable bottom component which covers the ground underneath the chicken house and the side-by-side ventilated plastic modules which support the ventilated floor are combined into a unitary bottom floor module. Each bottom floor module includes a flat base component and a plurality of upstanding hollow support elements or spacers. The hollow support elements are preferably cone-shaped and are truncated at the top to provide a flat upwardly facing support surface with a circular opening at its center. The flat base component of the bottom floor modules is rectangular in plan shape, preferably square, and the unitary modules are preferably injection molded of suitable polymeric material. The side edges of each flat bottom component also include an interlocking element or elements so that when they are set side-by-side on the ground, the flat bottom components interlock together. Thus, the flat bottom components cover the ground surface under the chicken house.

In this preferred embodiment, the ventilated floor is made up of a plurality of ventilated modular floor sections each having the same rectangular size and shape, preferably square, as the flat base component of the bottom floor modules. The rectangular ventilated sections are also injection molded of a suitable polymeric material and have numerous small holes to allow gas and moisture to pass therethrough but retain the manure and other solids on their upper surface. The ventilated floor sections also include cylindrical projections or lugs which extend from their lower surface and are sized to snap-fit or interlock into respective circular openings in the top of each hollow cone-shaped support element.

When assembling the floor assembly in this embodiment, the ventilated floor sections are preferably staggered with respect to the bottom modules. The staggered relationship produces an overall ventilated floor assembly which is an interlocked unitary structure over the entire floor surface of the chicken house, except adjacent the side edges due to the staggered relationship of the floor sections and bottom floor modules, which can be trimmed as necessary.

When assembled together, the side-by-side ventilated floor sections make up the ventilated floor. The side-by-side bottom modules, with their interlocked flat base components covering the ground surface and the cone-shaped spacers supporting the floor sections, form the closed bottom plenum underneath the ventilated floor.

One source of air flow into the growth chamber is created by a plurality of power-driven ambient air injection fans mounted in the attic plenum space of the chicken house. The fans have an air inlet port communicating with the attic plenum and an air discharge port communicating with the floor plenum. Fresh air can enter the attic plenum space through ambient air inflow permitting openings in the wide overhanging eaves of the chicken house. Ambient air is consequently pulled into the open attic plenum and discharged into the floor plenum where it is dispersed and rises up through the ventilated floor into the growth chamber.

A second source of air flow into the growth chamber is provided by a plurality of energy-saving indirect evaporative coolers and air blowers mounted along the side walls of the chicken house. The air blowers direct ambient or cooled air into the growth chamber which imparts a positive pressure to the growth chamber creating a pressure differential between the growth chamber and the floor plenum. This pressure differential can cause air, carbon dioxide, ammonia, methane, hydrogen sulfide, and moisture in the growth chamber consequently to flow downwardly through the geotextile carpet or other ventilated floor component into the floor plenum, leaving the dry manure retained on top of the geotextile carpet or other floor component. The air along with reduced quantities of carbon dioxide, ammonia, methane, hydrogen sulfide, and moisture in the floor plenum are then exhausted and discharged externally of the chicken house. By so doing, the humidity in the growth chamber is lowered and the ammonia and other air-borne contaminants from the manure on the ventilated floor, as well as in the entire growth chamber, are reduced or eliminated.

At harvest time, the chickens are gently urged by lights, sensory training and/or power-driven movable pusher wall to position them without injury on a removal conveyor along one side of the facility for removing the chickens from the facility.

When the chicken house is ready for cleaning, the dry manure can simply be vacuumed up from the ventilated floor surface or pushed by power equipment onto an evacuating conveyor. The ventilated floor assembly is then washed down and disinfected as necessary. Any broken components of the floor assembly can be replaced due to the modular design.

It is also part of the present invention that an external brooding house be used with a pair of traditional chicken houses. The external brooding house or area (hereinafter "the nursery") is provided with the same type of ventilated floor assembly as described previously for the traditional chicken house, and in more detail hereinafter. In a preferred embodiment, a single external nursery would serve two chicken houses, which would be arranged in the shape of the letter "H". The two chicken houses would comprise the spaced upright sides of the "H" and the nursery would make up the center section. The nursery is connected to both chicken houses, but environmentally separated such as by walls, doors or the like. Preferably, the end walls or doors of the nursery could be opened or raised to allow for the two week old chicks to migrate from the nursery into a respective one of the chicken houses to complete their growth period.

By having the external nursery equipped with the ventilated floor assembly of the present invention, forced air heat could be directed to the floor plenum, which would then rise up through the ventilated floor to heat the baby chicks, thus reducing the cost of heating dead space and providing the heat to the baby chicks at the appropriate height or level. Further, by properly alternating the schedule of production of the chicken houses, the nursery can supply two week old chicks in alternating cycles to the two respective chicken houses so as to allow for proper clean out time for both the chicken houses and the nursery. Such coordinated growth schedules can increase production by almost double that of two single chicken houses operating independently, as well as reduce early mortality to the baby chicks caused by contamination, temperature, and stress resulting from $CO_2$ and ammonia gases left over from the wet manure of the previous flock.

It is, therefore, an object of the present invention to provide a new and improved chicken growth or grow out facility or chicken house which reduces the moisture in the chicken house and particularly from the manure, thus leaving the manure dry.

Another object of the present invention is to provide a new and improved chicken growth facility or chicken house which significantly reduces the quantity of ammonia formation and bacteria growth in the chicken house and also reduces the levels of ammonia and bacteria exhausted from the chicken house to the outside atmosphere.

A further object of the present invention is to provide a chicken growth facility or chicken house having improved moisture and temperature control capabilities for better chicken growth and overall health.

A still further object of the present invention is to provide a new and improved chicken growth facility or chicken house in which the level of ammonia generation and bacteria growth are substantially reduced to improve the health of the flock and enhance the overall weight and uniformity of the mature chickens.

Still another object of the present invention is to provide a chicken house in accordance with the preceding objects that includes a ventilated floor assembly having a ventilated floor through which air and liquid can easily flow but which retains all solids on its upper surface, together with a closed bottom air plenum underneath the floor to draw air and other gases and airborne contaminants from the growth chamber into the plenum while at the same time keeping dry any manure retained on the ventilated floor upper surface.

A still further object of the present invention is to provide a ventilated floor assembly in accordance with the preceding object which is made of molded plastic modular components that can be assembled in an interlocked rigid floor assembly, including a ventilated floor and a closed bottom air plenum below the ventilated floor which provides a continuous bottom wall to protect the ground surface under the chicken house.

Yet a further object of the present invention is to provide a chicken house in which the ground underneath is sealed off to prevent darkling beetles from coming up out of the ground to feed on the manure and contaminate the growth chamber.

Still a further object of the present invention is to provide an external nursery, also equipped with the ventilated floor assembly of the preceding objects, which is connected between a pair of chicken houses and has coordinated production schedules that provide significantly increased production.

Yet another object of the new and improved chicken house of the present invention is to provide a more favorable environment for the chicken flock to remain healthy and grow to full weight.

An additional object of the present invention is to provide improved structures and methods for creating pressure differentials in chicken growth facilities for flushing undesired gasses from the facilities, including carbon dioxide from around the chickens.

Yet a further object of the present invention is the provision of structures and methods for effecting enhanced harvesting capability in chicken growth facilities.

These and other objects of the invention, as well as many of the intended advantages thereof, will become more readily apparent when reference is made to the following description taken in conjunction with the accompanying drawings.

DETAILED DESCRIPTION AND PREFERRED EMBODIMENTS

In describing preferred embodiments of the present invention, specific terminology will be used for the sake of clarity. However, the invention is not intended to be limited to the specific terms as selected. Therefore, it is to be understood that each specific term includes all technical equivalents, which operate in a similar manner to accomplish a similar purpose.

Figure 1:
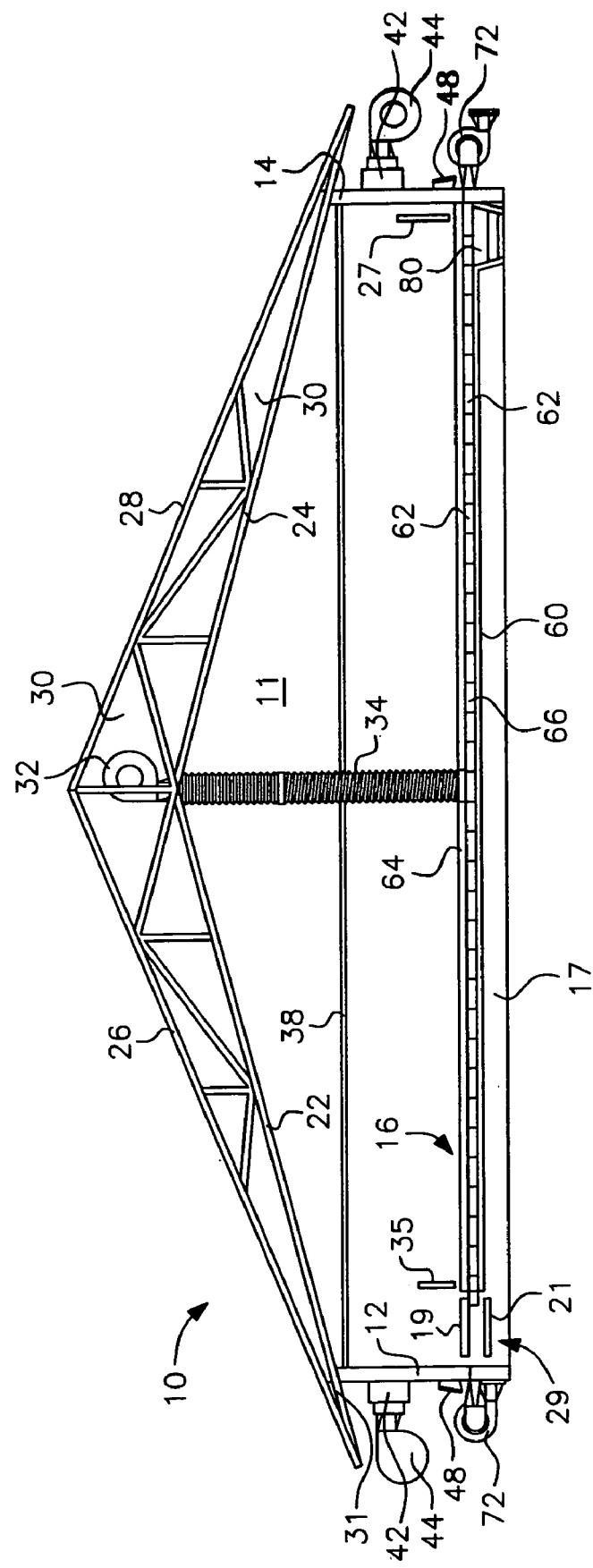
FIG. 1 is a front-end elevation of a chicken house equipped in accordance with the present invention with the forward wall removed for permitting illustration of the interior structure.

Turning initially to FIG. 1, a chicken growth facility or chicken house in accordance with the present invention is generally designated by reference numeral 10. The chicken house 10 can be either a newly constructed chicken house equipped in accordance with the present invention or an existing structure which is renovated and partially reconstructed, i.e., retrofitted, to incorporate the apparatus and method of the present invention.

Figure 3:
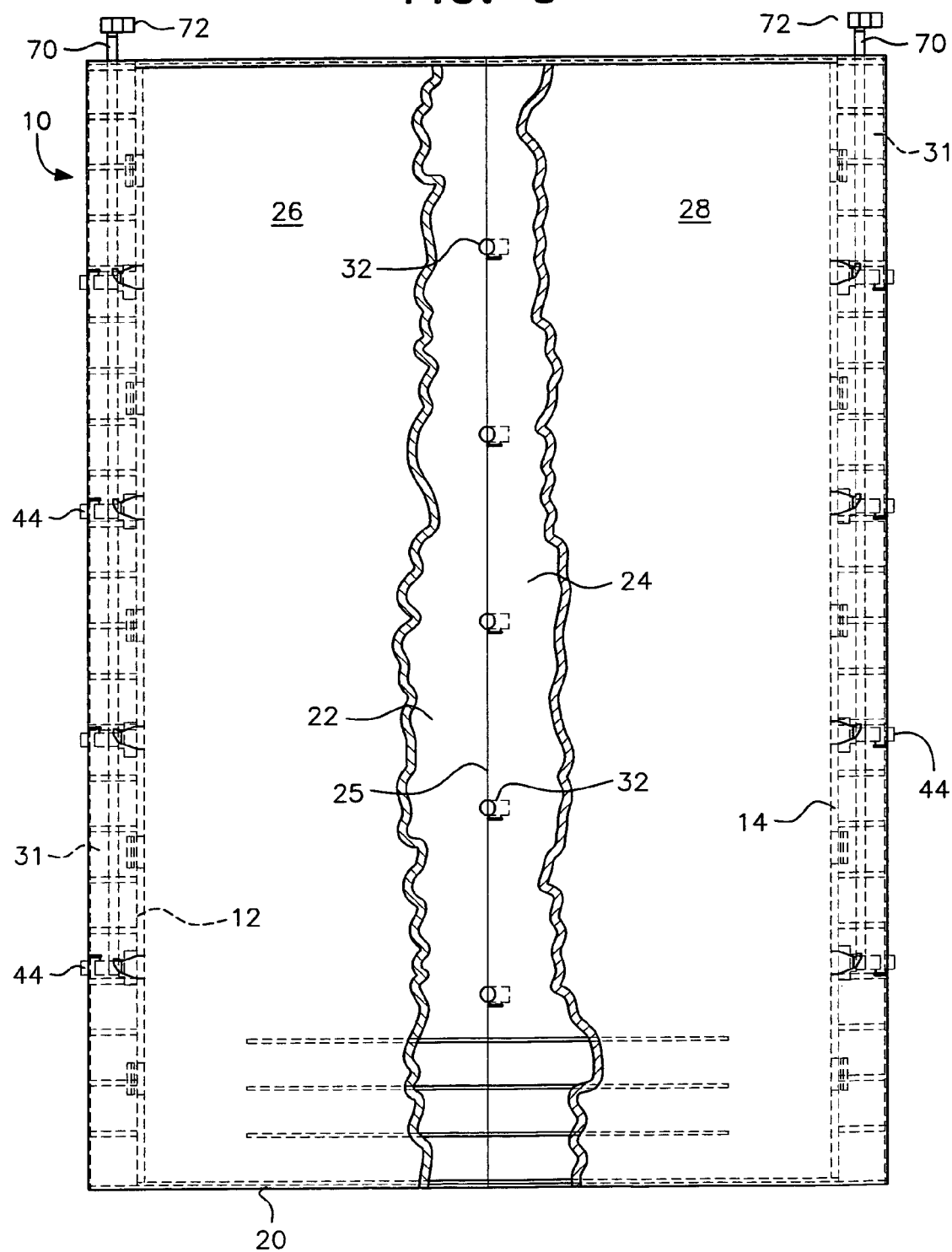
FIG. 3 is a top plan view of the chicken house of FIG. 1 with upper portions of the roof removed to permit illustration of the interior construction.
Figure 4:
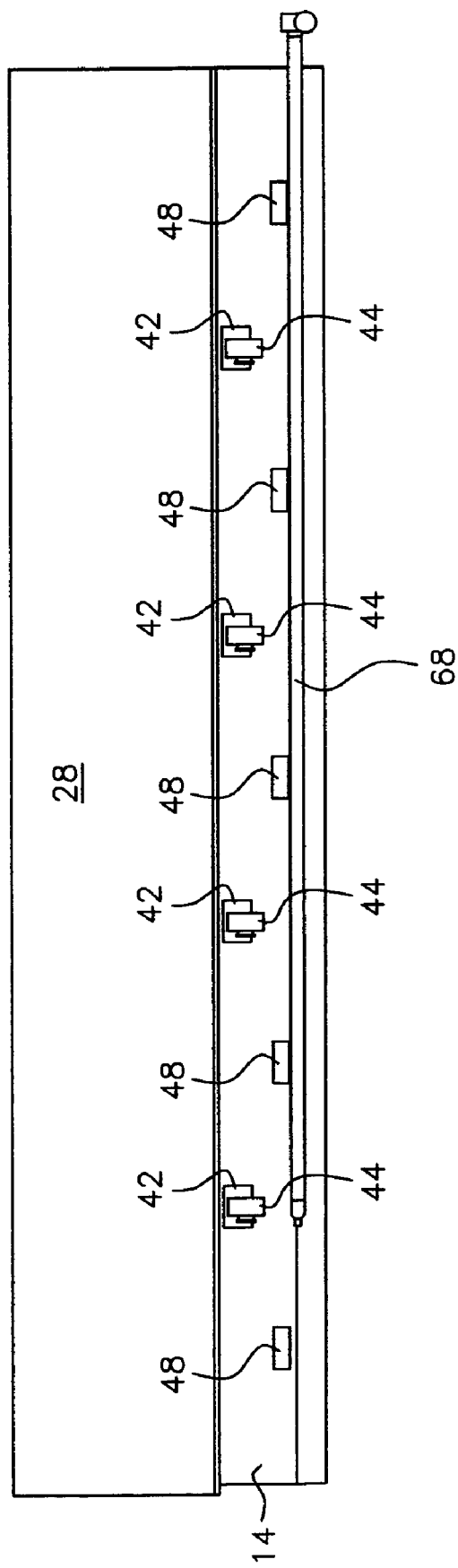
FIG. 4 is a right side elevation view of the chicken house of FIG. 1.
Figure 5:
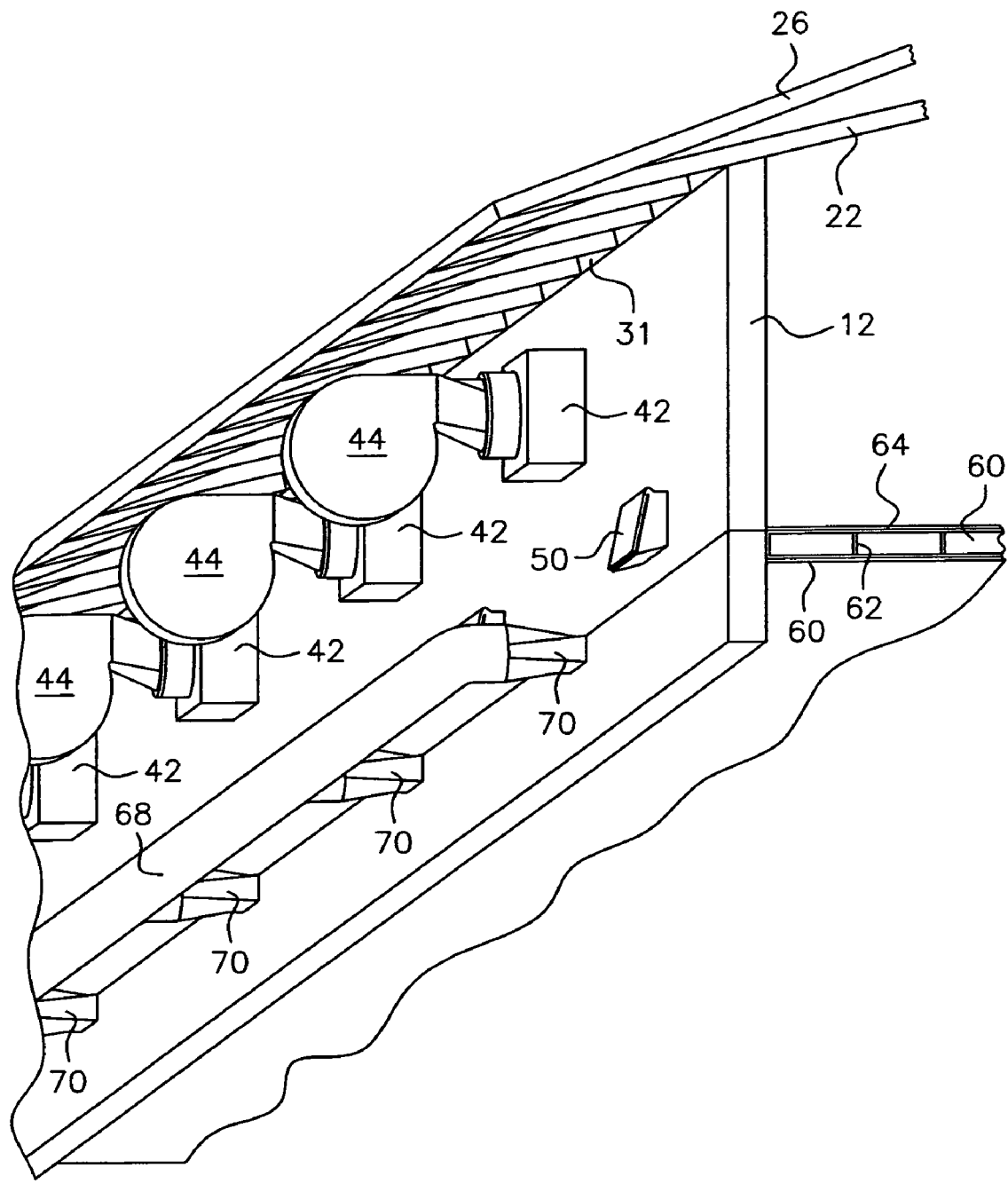
FIG. 5 is a perspective view of the forward left portion of the chicken house of FIG. 1 with the front wall removed for clarity.
Figure 6:
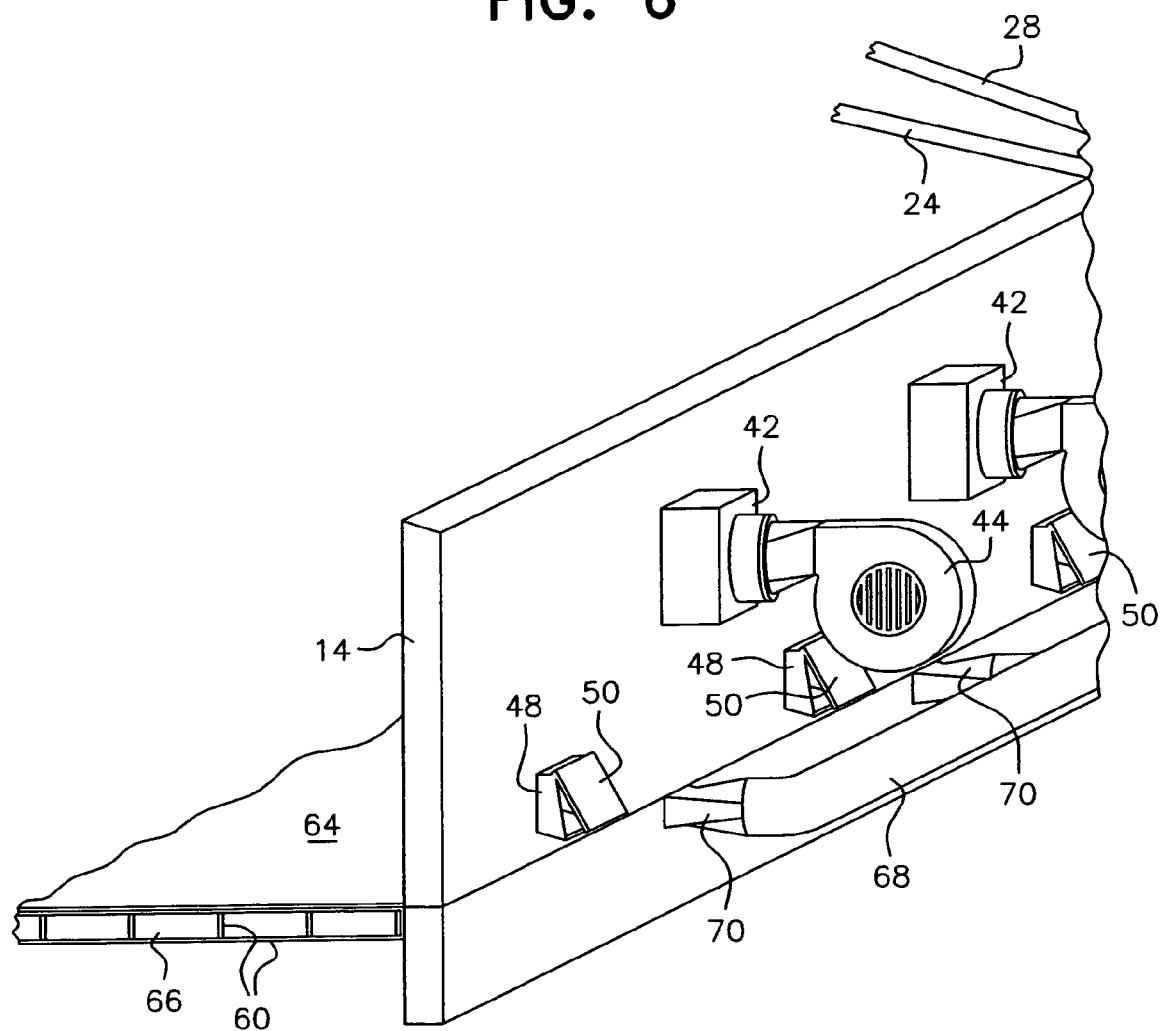
FIG. 6 is a perspective view of a portion of the forward right wall and adjacent floor section of the chicken house of FIG. 1 with the front wall removed for clarity.

The chicken house 10 provides an elongated growth chamber 11 generally defined by a left side wall 12, a right side wall 14, a rear wall 18, a front wall 20, and left and right ceiling panels 22 and 24, which are connected by a vertical front to rear center plane 25 (FIG. 3). Additionally, truss-supported left roof panel 26 and right roof panel 28 are connected to center plane 25 and cooperate with ceiling panels 22 and 24 to provide a ceiling plenum 30 extending the entire length of the house. This structure is typical of existing chicken houses with the floor formed by the ground on which bedding litter approximately 6 inches thick has been placed.

Figure 7:
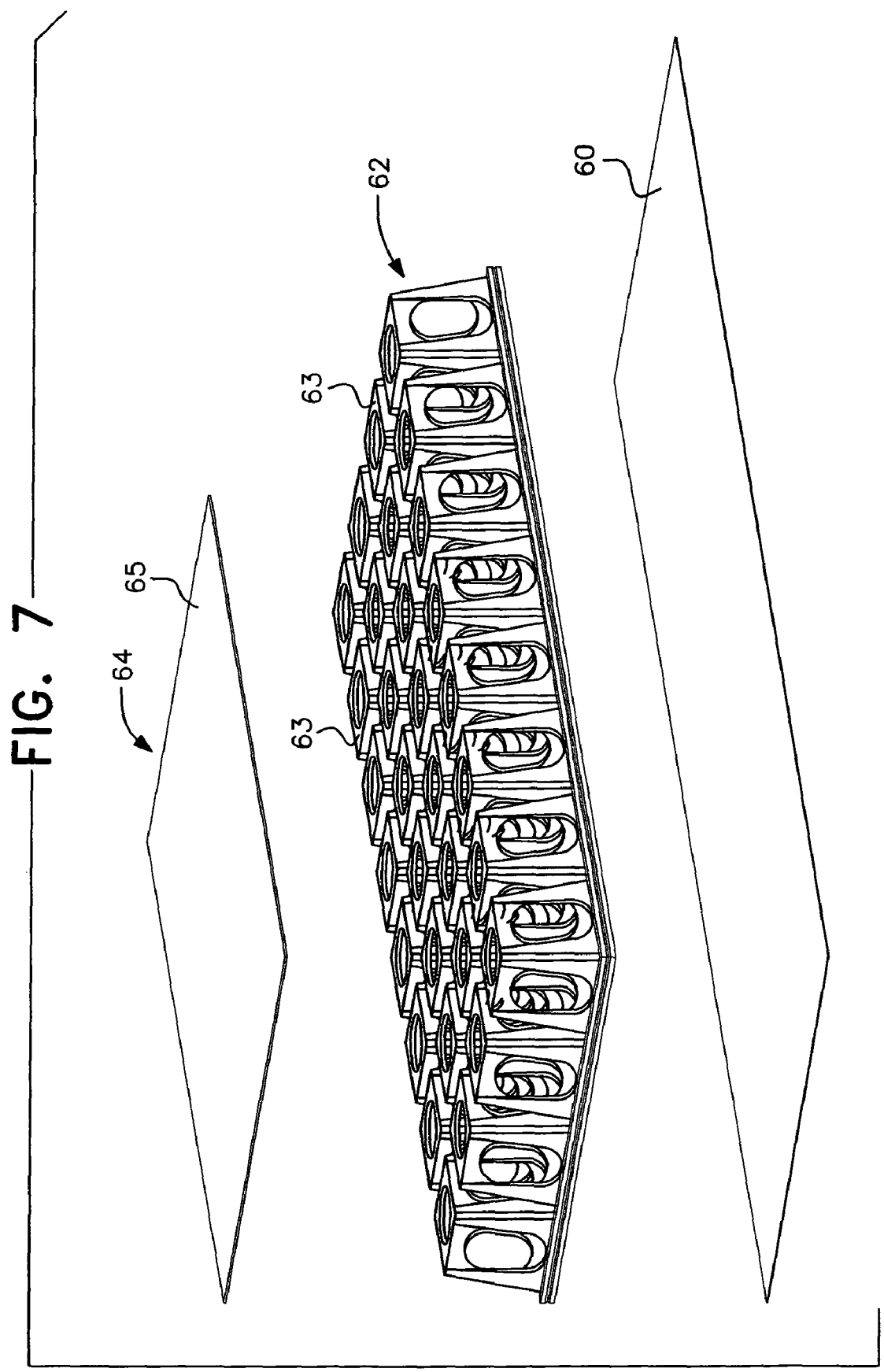
FIG. 7 is an exploded perspective view of one embodiment of a ventilated floor assembly for a chicken house in accordance with the present invention including three component elements thereof.
Figure 8:
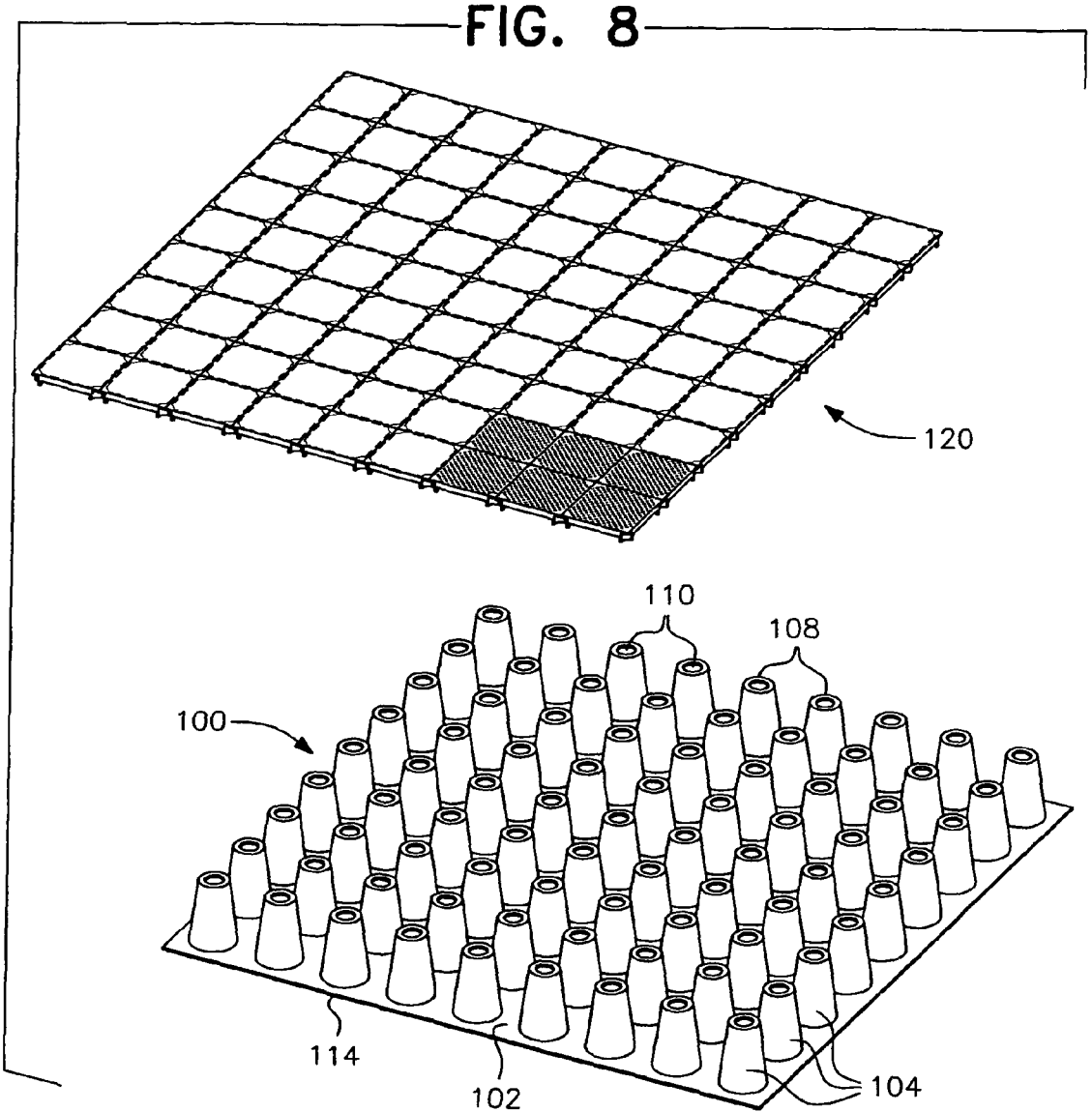
FIG. 8 is an exploded perspective view of a ventilated modular floor section and a bottom floor module which when assembled together and with similar side-by-side components make up a preferred embodiment of a ventilated floor assembly in accordance with the present invention.

Instead of the conventional bedding litter and ground as the floor, the present invention utilizes a ventilated floor assembly, generally designated by reference numeral 16, which extends between side walls 12 and 14 and end walls 18 and 20 and constitutes the entire floor of the growth chamber 11. The upper component of the floor assembly 16 is a ventilated floor 64, which in one embodiment can be formed of a conventional geotextile carpet 65 typically used for earth stabilization and drainage. In this embodiment, the carpet 65 is supported by a plurality of side-by-side unique ventilated hollow plastic modules 62 which comprise a second component. The modules 62, in turn, rest on a plastic vapor barrier 60, which comprises a third and lower component of the sandwich-like floor assembly 16, see FIG. 7. The plastic vapor barrier 60 is designed to rest on the earth surface 17, which thus supports the floor assembly 16 of the chicken house of the present invention.

The geotextile carpet 65 is typically formed of liquid non-absorbent knitted plastic threads or cords, as well known in the earth stabilization and drainage industries. One geotextile carpet suitable as the ventilated floor for the present invention is marketed under the designation US 1040 by U.S. Fabric Company of Cincinnati, Ohio. The US 1040 carpet is manufactured in widths of 12 and 16 feet which can be adhesively bonded along their edges to form a unitary carpet 65 that covers the floor of the typical chicken house which is 40 or 60 feet wide and 500 or 600 feet long. Liquid and gas can flow through the geotextile carpet 65; however, the geotextile carpet is sufficiently closely woven to support even the smallest chicks as well as their manure deposited on the upper surface of the carpet. It should be understood that carpet 65 can also be formed of other materials, such as metal mesh or screens or woven plastic materials, and one preferred embodiment is described hereinafter.

The ventilated rectangular plastic modules 62 (FIG. 7) which form the middle component of floor assembly 16 have an egg crate type structure to provide a hollow interior through which liquid and gas can easily flow from the lower surface of carpet 65 into and laterally throughout the middle component of the floor assembly 16. Each module 62 is preferably molded of a suitable polymeric material and comprises a unitary structure having a rectangular plan shape of approximately 2 feet by 4 feet and a height of about 2 inches, but can vary depending on conditions and manufacturer. Each module 62 includes a plurality of hollow-tapered bottomless columns 63 having an approximately square outer cross-section and a peripheral rectangular base frame 67. Each column 63 tapers inwardly from bottom to top, and modules 62 can consequently be stacked for shipment and/or storage in a nested mating manner in which the columns 63 of a lower module are each matingly received within the interior of corresponding columns in the next upper module.

The waterproof vapor barrier 60 comprising the lower component of the floor assembly 16 is preferably made of an impermeable inert polymeric material, such as approximately 6 to 8 mils thick polyethylene sheeting or the like. The barrier extends upwardly about the sides and ends of the outer modules 62 to define a floor plenum 66 in which a partial vacuum can be created to aid in air and liquid flowing from growth chamber 11 downwardly through geotextile carpet 65. Such air flow through manure resting on carpet 65 results in drying of the manure. Further, the pressure differential between the growth chamber 11 and the floor plenum 66 causes moisture flowing through carpet 65 to more readily vaporize. Air, water, vapor and gases, such as ammonia, methane, and carbon dioxide, in plenum 66 are removed by two vapor and gas removal conduits 68 which are respectively provided externally of left wall 12 and right wall 14, as best shown in FIG. 1, and described hereinafter. Any liquid build-up in plenum 66 can flow into a liquid removal trough 80 extending along the right side wall 14. A similar trough can also be provided along left side wall 12, if needed.

The interior of conduits 68 communicate with the vacuum plenum 66 by means of four or more hollow connection pipes 70 each having one end communicating with the floor plenum 66 and the other end communicating with the interior of vapor removal conduit 68. The rear end of each vapor removal conduit 68 is connected to an electrically driven suction blower 72 to cause negative (sub-atmospheric) pressure in floor plenum 66 and removal of gas and air from plenum 66. Operation of the suction blowers 72 consequently creates a pressure drop between the upper surface of manure deposited on geotextile carpet 65 and plenum 66, thus causing air to flow downwardly through the manure to effect drying of the manure. The air flow also causes movement of moisture and/or liquid and noxious gases to flow through the manure and carpet 65 into the plenum 66 from which it is then removed by gas and vapor removal conduits 68 and suction blowers 72 for discharge from the chicken house. Such air flow does not result solely from operation of blowers 72 but is increased and aided by evaporative cooling blowers 44, described hereinafter, which create positive air pressure in growth chamber 11.

Ceiling plenum air blowers 32 are provided in the ceiling plenum 30 with each blower having an inlet communicating with the air in plenum 30 so that blower operation can pull fresh air in through air inflow openings 31 in the eaves of structure 10. Blowers 32 each have an outlet discharging into a downwardly extending conventional pleated conduit tube 34 having a lower end 36 through which air from its respective blower is discharged. The lower end 36 of conduit tubes 34 extend flush to carpet 65 allowing air to flow into the floor plenum 66. Thus, the warm air in the ceiling plenum 30 can be discharged from the lower ends 36 of pleated conduit tubes 34 into the floor plenum 66 from which it rises (warm air rises) through ventilating carpet 65 to warm the growth chamber 11, which is particularly beneficial during the growth of baby chicks at the beginning of the growth cycle. The length of each pleated conduit tube 34 can be adjusted to vary the elevation of its lower end 36 above the upper surface of ventilated floor assembly 16 as exemplified by the four conduit tubes shown in FIG. 2 which have lower ends 36 in the floor and the shortened remaining conduit tube which has its lower end 36' in an elevated position.

A plurality of energy-saving indirect evaporative coolers 42 are fitted in each of side walls 12 and 14 for providing fresh and cool air in growth chamber 11 when required by ambient temperature conditions. Each cooler is preferably one of the types disclosed in Maisotsenko et al. U.S. Pat. No. 6,854,278, the disclosure of which is expressly incorporated by reference as if fully set forth herein. Coolers 42 employ an indirect evaporative cooling process that evaporates water in one chamber and cools an air stream in an adjacent chamber as discussed in detail in the aforesaid Maisotsenko et al. patent. Each cooler 42 is associated with a blower 44 which moves the air through the cooler where the air is cooled during warm weather prior to movement through openings 46 (see FIG. 2) in side walls 12 and 14. Movement of the air through openings 46 acts to create positive air pressure in growth chamber 11. Simultaneous operation of plenum air blowers 32 and blowers 44 of the indirect evaporative coolers should be carried out to provide the optimum air pressure in chamber 11.

The positive pressure generated in growth chamber 11 by the air flow from blowers 44 also acts to remove carbon dioxide which accumulates near ventilated floor assembly 16. More particularly, openings 49 are formed near the bottom of side walls 12 and 14, slightly above floor assembly 16, which connect to floor exhaust pressure relief valves 48 having flaps 50 which open in response to excessive pressure in growth chamber 11. Hence, when the positive air pressure in growth chamber 11 reaches a specified level adjacent a relief valve 48, say about 1-2 psig, the associated flap 50 will automatically open and force carbon dioxide, which may have accumulated adjacent the growing chickens, out of the chicken house.

Coolers 42 and blowers 44 are capable of providing sufficient cool air to compensate for the animal heat of the chickens during warm weather which can be as much as 5 BTU/lb/hr or approximately 1,100,000 BTU/hr in a 30,000 sq. ft. chicken growth chamber. Such volume of air is more than sufficient to flush carbon dioxide gas from the facility, properly oxygenate the air surrounding the chickens and provide the chickens with appropriate temperature for optimal development. It should also be noted that warming of the interior of growth chamber 11 can be aided by use of existing forced air gas heaters in existing structures being modified to practice the present invention or by the incorporation of such gas heaters in a new building being constructed for practice of the invention.

Maximum downward airflow through ventilated floor 64 occurs when cooling blowers 44 and suction blowers 72 are simultaneously operated; however, operation of either one of these blowers should be adequate to create a sufficient volume of air flowing downwardly through the manure and ventilated floor 64 to dry the manure. The drying of the manure prevents liquid build-up in the manure so as to preclude or reduce the formation of ammonia and pathogens (and perhaps methane) substantially below that which would otherwise occur using conventional methods and structures.

A preferred embodiment of components for the ventilated floor assembly 16 is illustrated in FIGS. 8-14, and this two component floor assembly is generally designated by reference numeral 98. In this embodiment, the plastic vapor barrier 60 and ventilated hollow plastic modules 62 previously described are combined into a unitary bottom floor module, generally designated by reference numeral 100. Each bottom floor module 100 includes a flat base component 102 and a plurality of upstanding hollow support elements or spacers 104. The support elements or spacers 104 are preferably cone-shaped tapering downwardly from the top to the bottom. The cone-shaped support elements are hollow and open at the bottom at 106, see FIG. 9. The support elements 104 are also truncated at the top to provide a flat upwardly facing support surface 108 with a circular opening 110 at its center.

The unitary bottom floor modules 100 are preferably injection molded of suitable polymeric material. Modules 100 include interlocking elements 112 along the side edges 114 of each flat base component 102, see FIGS. 13 and 14. When the bottom floor modules are placed side-by-side on the ground, the interlocking elements 112 are engaged so that the flat base components 102 of the modules 100 cover the entire ground surface under the chicken house.

In this preferred embodiment, the ventilated floor 64 is made up of a plurality of ventilated modular floor sections, generally designated by reference numeral 120, which have the same rectangular size and shape, preferably square, as the base 102 of the bottom floor modules 100. The rectangular floor sections 120 are also injection molded of a suitable polymeric material and include a large number of small holes 122 extending completely therethrough. The holes 122 are sized to allow air and other gases to pass therethrough but retain the manure and other solids on their upper surface.

Figure 9:
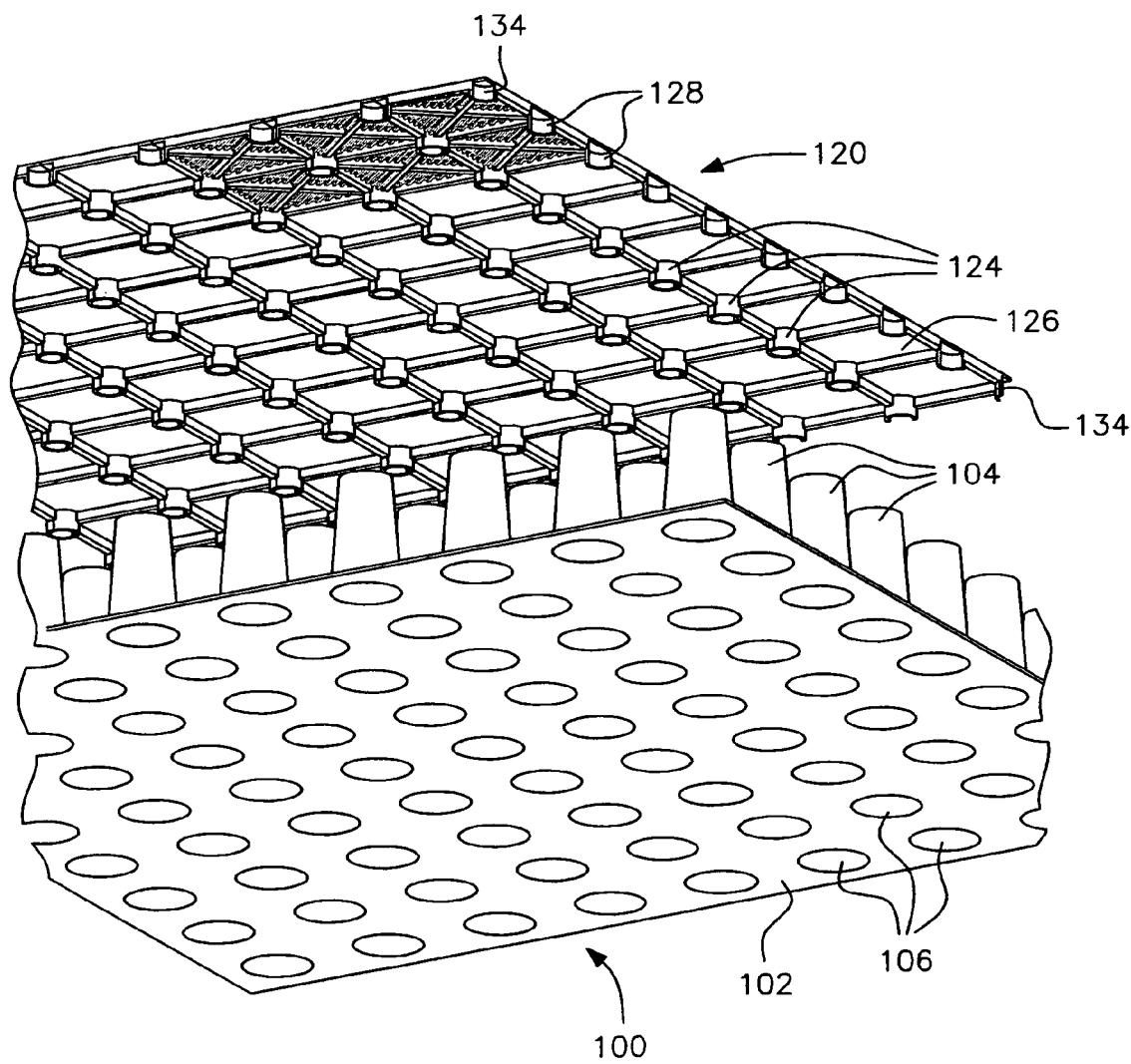
FIG. 9 is an exploded perspective view of the floor components shown in FIG. 8, but looking from underneath of the components.
Figure 10:
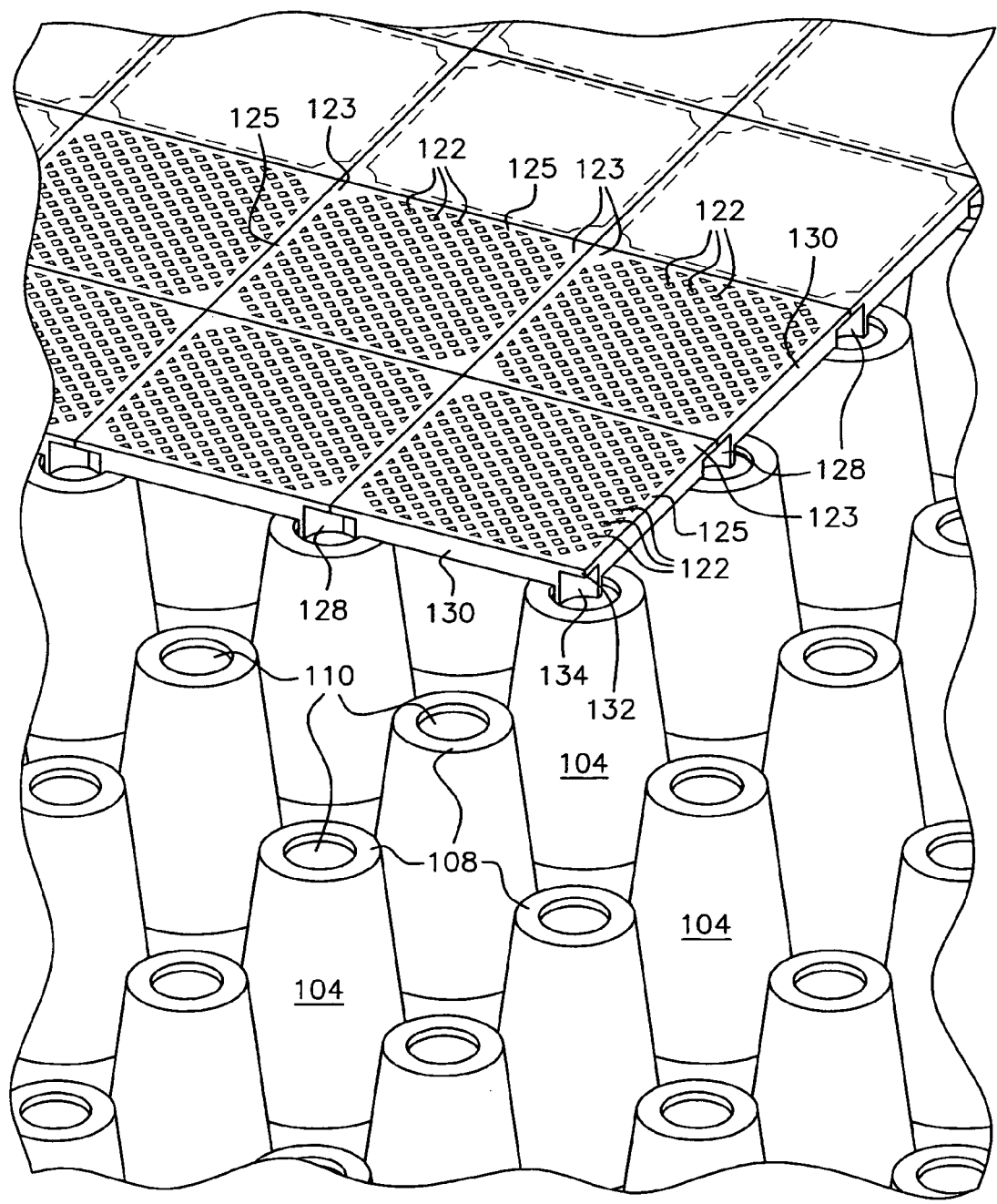
FIG. 10 is an enlarged perspective view of the floor components shown in FIG. 8, with the components connected by fitting the depending projections or lugs of the floor section into respective circular openings in the truncated top surface of the support members or spacers of the bottom floor module.
Figure 11:
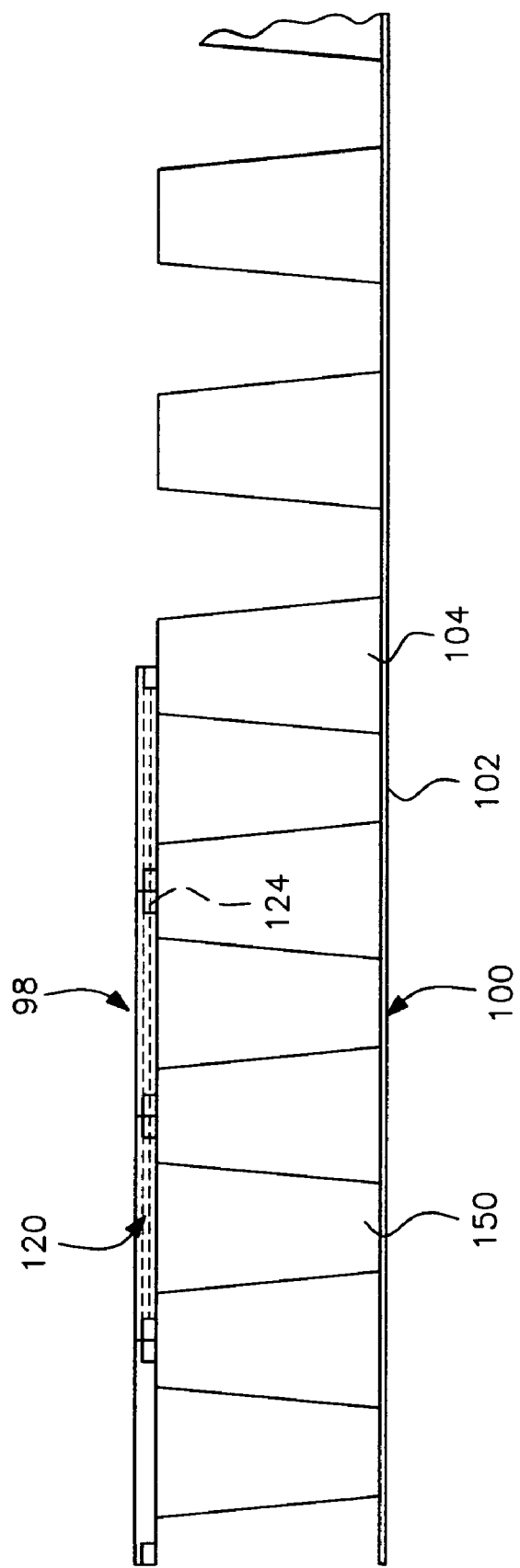
FIG. 11 is a side elevation view of the floor components shown in FIG. 8, in assembled condition, as shown in FIG. 10.

The floor sections 120 also include cylindrical projections or bosses 124 which extend from the lower surface 126 and are sized to pressure-fit or snap-in fit for interlocking into respective circular openings 110 in the tops of the support elements or spacers 104. As shown in FIGS. 9 and 10, the projections 128 along the side edges 130 of the floor sections 120 are only half cylinders such that they fit into only one-half of the openings 110 in spacers 104. The other half of the opening 110 is filled by the mating mirror image half cylinder 128 of the adjacent floor section 120. At the corners 132 of each floor section 120, the projection 134 is reduced to a quarter-round projection so that when the ventilated floor sections 120 are set side-by-side, the quarter-round depending projections 134 at adjacent corners of four sections are fitted into the same opening 110.

It will be seen that holes 122 cover most of the surface of sections 120, except areas 123 where projections or lugs 124, 128 and 134 are positioned, and along side edges 125, see FIG. 10. The areas where the projections or bosses 124, 128 and 134 project from the bottom surface of the section 120 remain solid (non-perforated) to ensure a seal from underneath the floor assembly 98. This is because the cone-shaped elements or spacers 104 are hollow for the injection molding and, therefore, open at the bottom, at 106. This seal is necessary to prevent the intrusion of darkling beetles surfacing from the ground and feeding from the chicken manure retained on the ventilated floor formed by sections 120.

Figure 12:
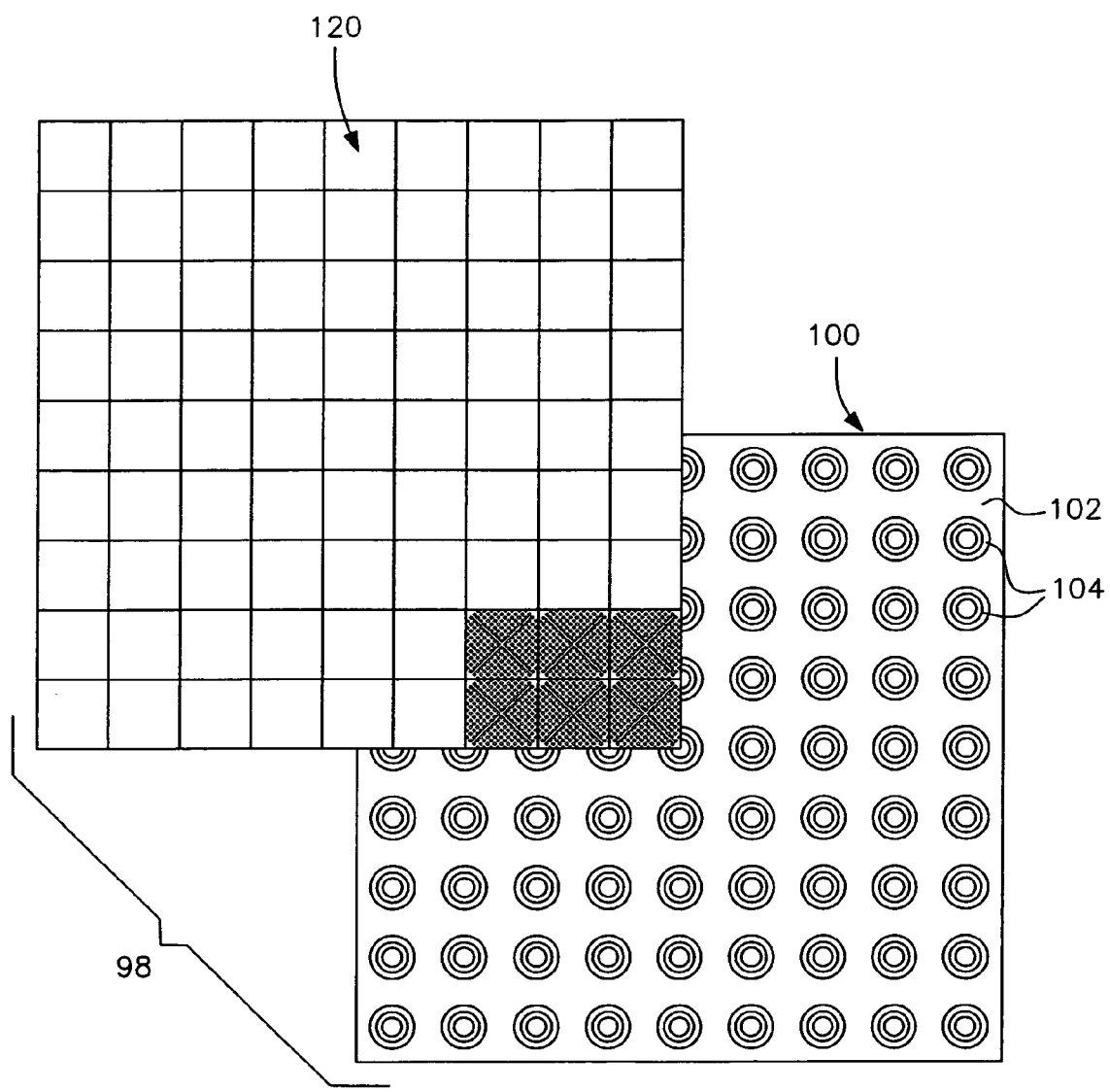
FIG. 12 is a top plan view of the floor components shown in FIG. 8, when assembled in a staggered relationship in accordance with the present invention.
Figure 13:
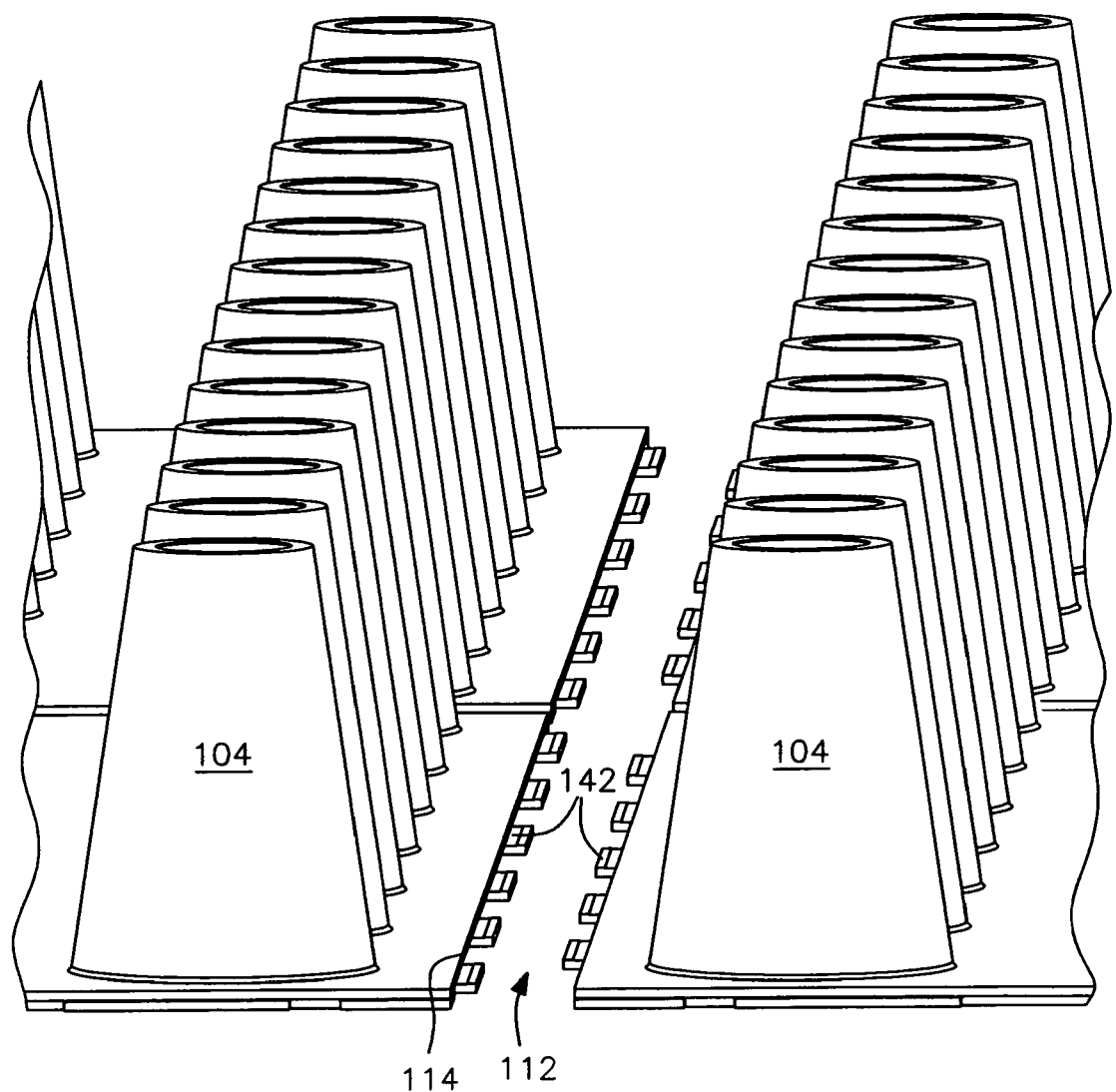
FIG. 13 is a perspective view of multiple bottom floor modules positioned for assembly in interlocked side-by-side relation in accordance with the present invention.
Figure 14:
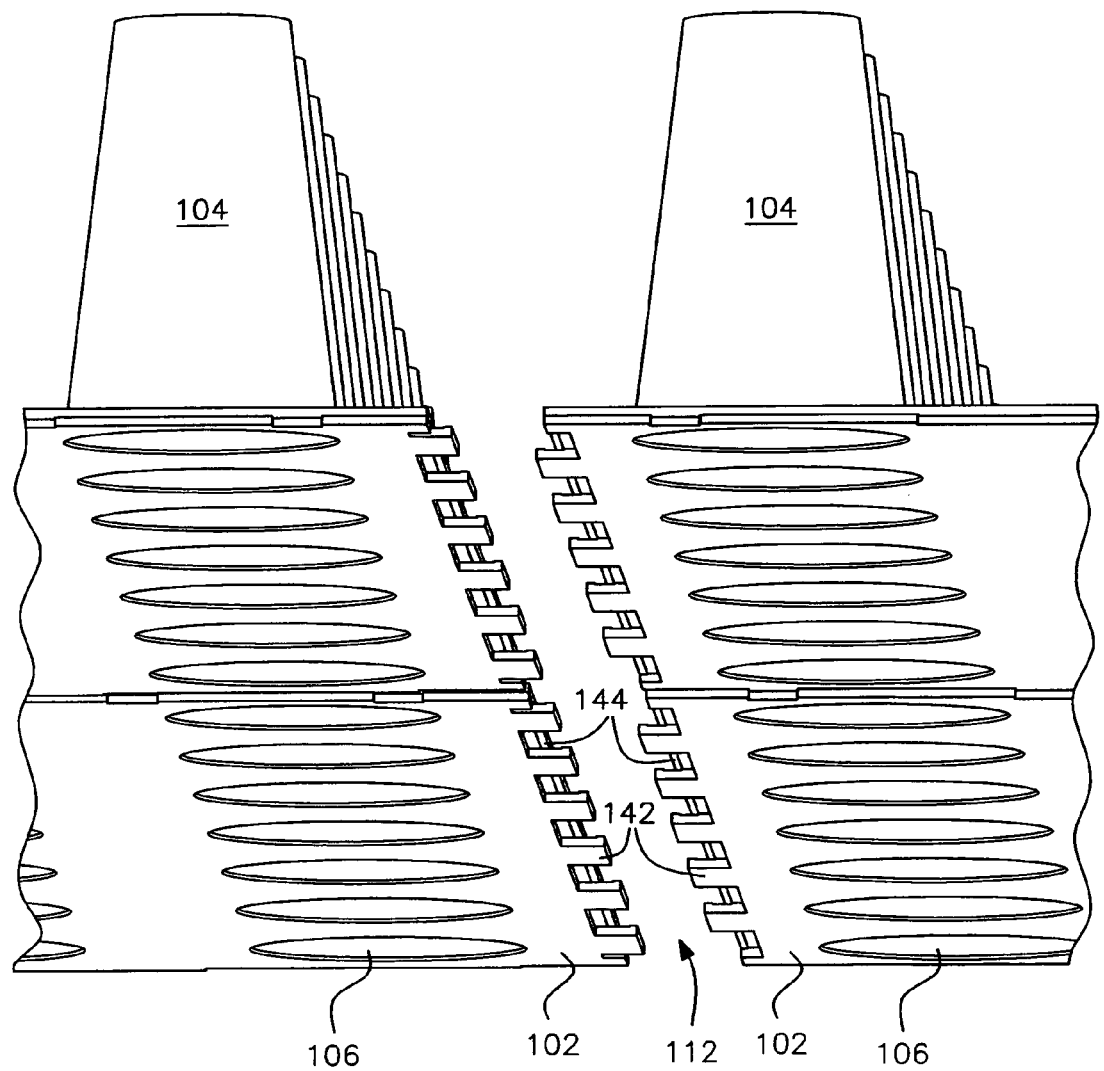
FIG. 14 is a perspective view of the bottom floor modules shown in FIG. 13, but looking from underneath the modules.

The bottom floor modules 100 are interlocked along their side edges 114 by interlocking elements 112. A preferred embodiment of the interlocking elements 112 is shown in FIGS. 13 and 14 and take the form of staggered projections 140 and recesses 142, which interlock each flat base component 102 to its adjacent flat base component 102 of the adjacent bottom floor modules 100. The ventilated floor sections 120 are preferably staggered with respect to the bottom modules 100 such that there is a one quarter area overlap, as shown in FIG. 12. Hence, each floor section 120 preferably overlies an adjacent one quarter area of four adjacent and interconnected bottom floor modules 100. This staggered relationship produces an overall ventilated floor assembly 16 which is in the form of an interlocked unitary structure covering the entire floor surface of the chicken house. Around the side edges of the assembly 98, unmated portions of the floor sections 120 and bottom floor modules 100 can be trimmed as desired.

Once assembled into the ventilated floor assembly 98, the interlocked floor sections 120 and bottom floor modules 100 form a closed bottom floor plenum 150 underneath the ventilated floor (see FIG. 11), which operates in the same way as previously described floor plenum 66 in the earlier embodiment of floor assembly 16 utilizing the geotextile carpet 65. All of the other components of the chicken house remain the same and operate in the same way. Hence, when suction blowers 72 cause a negative (sub-atmospheric) pressure in floor plenum 150, the pressure drop between the upper surface of the rectangular floor sections 120 and the floor plenum 150 causes the air and other gases in the growth chamber 11 to flow downwardly through the manure and openings 122 to effect a drying of the manure and removal of the noxious gases from the growth chamber.

A preferred method for assembling the two component floor assembly 98 is to place four bottom modules 100 interlocked among themselves onto the ground where the floor assembly 98 is to be assembled. A ventilated top section 120 is then placed in the center of the square created by the four interconnected bottom floor modules 100 to thus engage the adjacent one-quarter sections of the four bottom pieces together by interlocking the projections 124, 128 and 134 into their respective openings 110 of the cone-shaped spacers 104. Bottom floor modules 100 and floor sections 120 are then respectively interlocked in the direction desired, until the entire ventilated floor assembly 98 has been erected. At the end there will be exposed (unmated) bottom floor modules 100 and/or rectangular floor sections 120 along the perimeter of the floor assembly. These modules and/or sections can be cut to have matching side edges for the ventilated floor 64 and base components 102.

In a preferred design of the two component floor assembly 98, the bottom floor modules 100 and matching floor sections 120 are both about 18 inches square. The cone-shaped hollow spacers or studs 104 are approximately 2½ inches tall protruding from the solid square flat base component 102. The holes 122 of the floor sections 120 are preferably square, approximately 93 mils on each side. In accordance with the present invention, the size of holes 122 can vary from as little as about 0.030 inches square to as large as about ⅛ inch square, and the holes 122 comprise about 20% to about 30% of the surface area of the section 120. The projections or lugs 124, 128 and 134, and associated circular openings 110 in the top of hollow cone-shaped spacers 104 are preferably about ⅜ inch to about ½ inch in diameter.

The flat base component 102 of the bottom floor module 100 has a smooth upper surface and, when interlocked to form the ventilated floor assembly 98, allows the air and other gases to flow around the cone-shaped spacers or studs 104 in all directions with no entrapment areas. The ability to tightly interlock the base components 102 as well as the round shape of the spacers 104 allows for less air resistance, or better air flow, of the air and other gases through the plenum 150 and also provides for a smooth surface for wash down if necessary with no entrapment areas.

Figure 2:
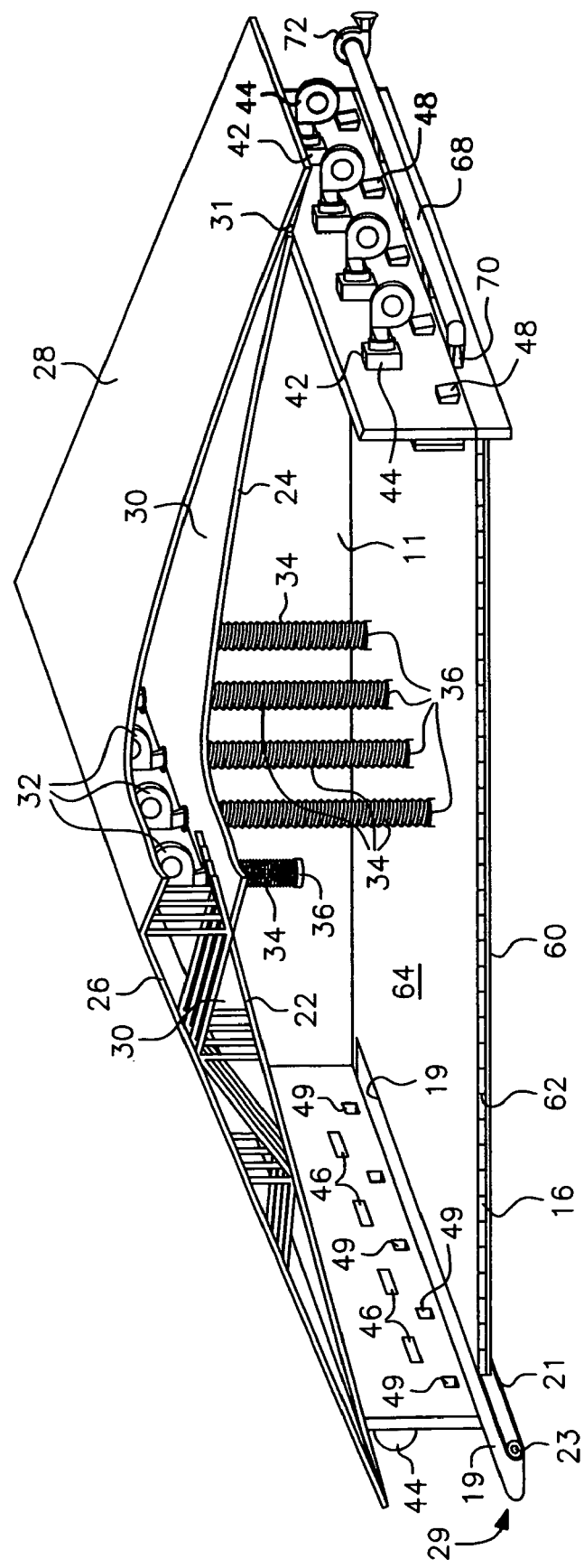
FIG. 2 is a right front perspective view of the interior and exterior portions of the chicken house of FIG. 1 with structural portions being removed for clarity.

The present invention also includes a unique conveyor system for harvesting the grown chickens at the end of the growth cycle and removing the dried manure after chicken harvesting. Specifically, fowl removal conveyor 29 extends adjacent along left side wall 12. The conveyor 29 includes a horizontal upper flight 19 and a lower horizontal flight 21 supported by an upstream support roller (not shown) and a downstream support and drive roller 23 (FIG. 2).

A movable pusher wall 27 extends along the length of right side wall 14 during the entire growth period and is used at harvest time, in a manner to be described, for gently positioning the fowl onto removal conveyor 29. More specifically, pusher wall 27 is supported by pulleys (not shown) riding on transverse support cables 38 extending across the width of growth chamber 11 between walls 12 and 14. Power actuated winches (not shown) are operable for also lifting pusher wall 27 to an elevated position from the position illustrated in the drawings to enable maintenance equipment to be operated on ventilated floor assembly 19. Additional power-driven winches (not shown) are provided with cables connected to pusher wall 27 for slowly moving pusher wall 27 from its FIG. 1 position adjacent right wall 14 to a position adjacent the right side of upper flight 19 of fowl removal conveyor 29 to effect positioning of ready-to-harvest poultry on upper flight 19.

A vertically movable side gate 35 is supported for vertical movement by support cables and power-driven winches (not shown) adjacent the right side of upper flight 19 during the growth period of the fowl to prevent the fowl from moving onto and fouling upper flight 19. However, at harvest time, side gate 35 is lifted by the power-driven winches to an elevated position to permit the fowl to be moved onto upper flight 19 by pusher wall 27 and also to permit operation of maintenance equipment on ventilated floor assembly 19. While the primary purpose of the conveyor 29 is to remove the grown chickens from the chicken house at harvest time, conveyor 29 can also be used, with side gate 35 in its down position, by the farmer, to remove dead birds culled from the flock during the growing cycle.

The operation of the various blowers of the present invention will now be described for a chicken growth cycle. A complete growth cycle for chickens extends over about a seven-week period and comprises three distinct growth periods, each of which involves progressively controlling the environment in the growth chamber 11 in accordance with the changing needs of the fowl as they progress from baby chick status to mature harvest status.

The first growth period comprises the first two weeks of growth, during which the indirect evaporative coolers 42 and suction blowers 72 are not operated and floor exhaust valves 48 are closed. However, the plenum air blowers 32 are activated and warm air in ceiling plenum 30 is forced downwardly for discharge from the lower ends 36 of the pleated conduit tubes 34. The pleated conduit tubes 34 have their lower ends in their lowermost position in the floor plenum 66 of the floor assembly 16 so that the warm air is forced back up through the carpet 65 to heat the baby chicks from underneath. This upward heating provides better and more uniform heat for the small chicks. Such heating is likely necessary even in the summer for the small chicks during the first growth period. Ambient fresh air, as needed, can be pulled into ceiling plenum 30 through openings 31 by blowers 32.

In addition, or alternatively, to the warm air from the ceiling plenum 30, heated air from the heated air ventilating system of the chicken house may be introduced directly into the floor plenum to provide the upward heating to the small chicks.

The second growth period consists of the three weeks following the first growth period. During the second growth period the pleated conduit tubes remain in their lowest position and provide forced air flowing from the ceiling plenum as described in the preceding paragraph. Cooling blowers 44 are also activated to maintain positive pressure in the growth chamber and are controlled at required levels by the opening of valves 48. However, cooling units 42 through which blowers 44 discharge air are not normally operated during this second growth period.

The third, and last, growth period consists of the last two weeks of the growing cycle. During this period, the floor exhaust pressure relief valves 48 are operative to relieve excessive pressure and discharge carbon dioxide. Pleated conduit tubes 34 remain in their lowered position and plenum air blowers 32 are operated to provide air through the pleated conduit tubes as described above. Negative pressure is provided in the floor plenum 66 by operation of the suction blowers 72. The indirect evaporative coolers 42 and blowers 44 are also operated to cool the growth chamber even during winter due to the heat generated by the birds during this last growth cycle. The forced air aids in maintaining positive pressure in the growth chamber for forcing maximum flow of air downwardly through the manure which may have collected to a depth of one and one half inches or more resting on top of geotextile carpet 65.

It should be understood that external conditions, such as temperature and humidity variations, might require adjustments of one or more of the environmental controls for the growth chamber during this or any of the other growth periods.

At the end of the seven-week growth period the chicken harvesting is begun. The lower ends 36 of the pleated conduit tubes 34 are lifted out of the floor plenum and to a height sufficient to permit them to clear the upper extent of moveable wall 27, and to allow workers and equipment to move freely in the growth chamber. Side gate 35 is also lifted to its elevated position. The power-driven winches connected to pusher wall 27 are then activated for initiating the very slow movement of pusher wall 27 toward conveyor upper flight 19. Additional mechanisms to move the birds toward conveyor upper flight 19 are light beams and sound signals to which the birds have been conditioned for movement toward flight 19.

Pusher wall 27 consequently acts to gently urge and carefully nudge the chickens onto upper flight 19 of conveyor 29. The foregoing movement of pusher wall 27 requires approximately four hours to complete the harvesting procedure (for a chicken house approximately 30 feet wide) during which time conveyor 29 is activated to move the fowl to the downstream end of the conveyor external of the growth chamber 11 where the fowl are then placed in cages for transport to a processing facility.

Upon completion of evacuation of the fowl, the dried manure on the upper surface of ventilated floor assembly 16 or 98 is blown on to upper flight 19 of the conveyor 29 by use of snow blowers or the like, and the conveyor 29 thus removes the dry manure from growth chamber 11. In the absence of conveyor 19, the dry manure can simply be vacuumed up.

It is also contemplated that ultra-violet light will be used in the growth chamber 11 for destroying *salmonella, E-coli, coccidiosis*, and multiple bacteria strains and fungus/mold during the chicken growth period as it develops, and in a final cleaning procedure following removal of the chickens and dry manure from the growth chamber. One such system and method is disclosed and claimed in co-pending application, filed on Jun. 1, 2005, entitled "System and Method for Providing Germicidal Lighting for Poultry Facilities" (Ser. No. 11/141,190), owned by the same assignee, the disclosure of which is expressly incorporated in this application as if fully set forth herein.

Figure 15:
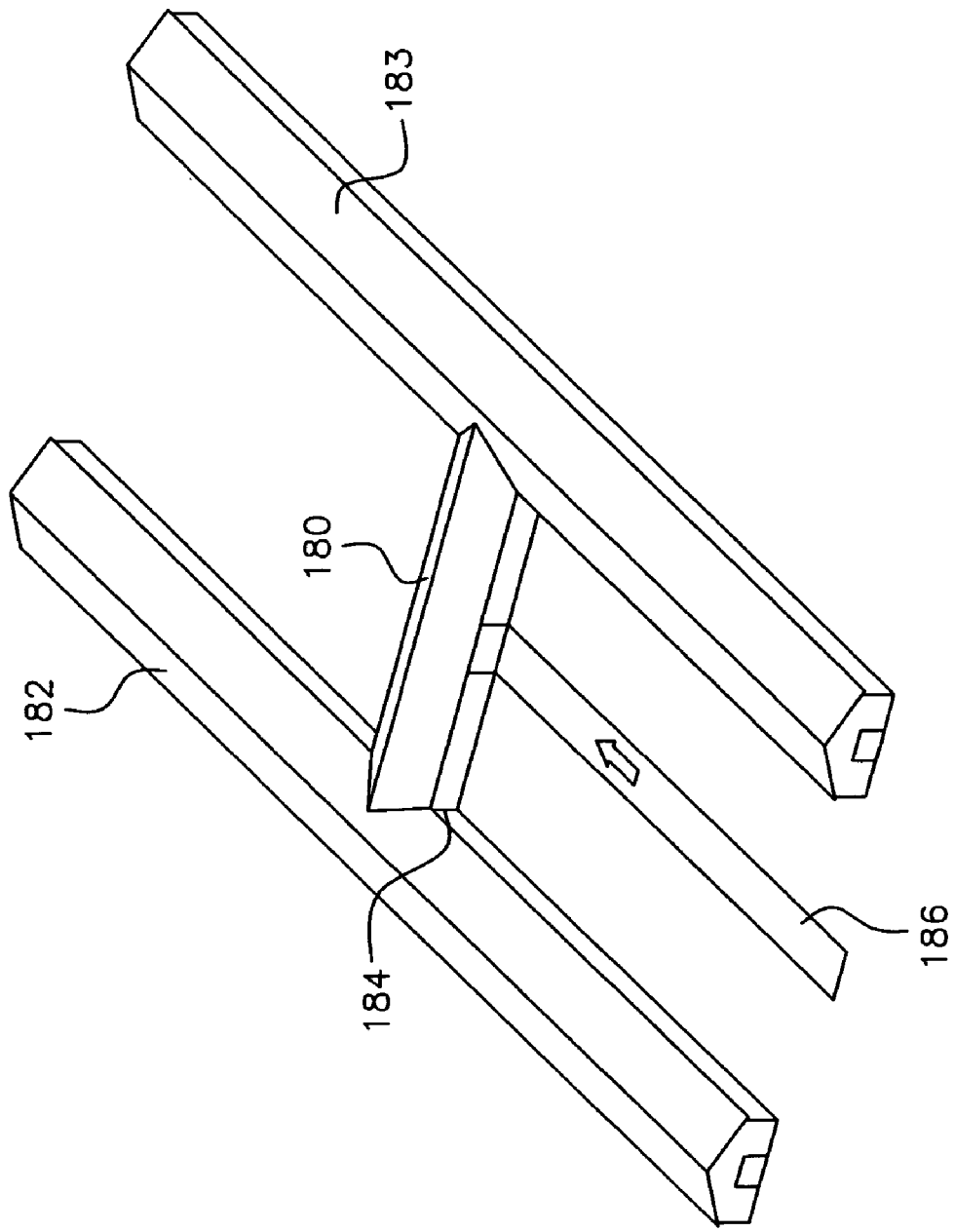
FIG. 15 is a top perspective view of a combined external nursery and pair of chicken houses in an "H" configuration in accordance with the present invention.
Figure 16:
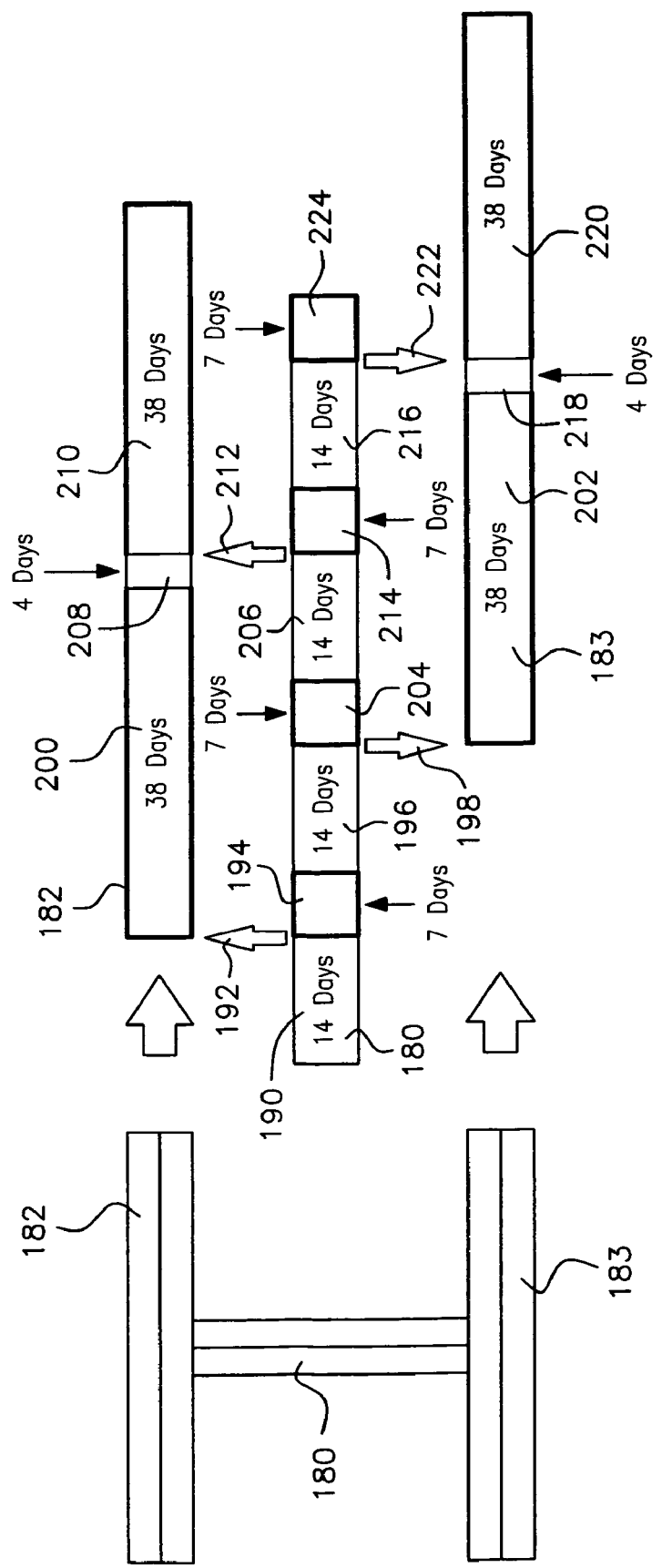
FIG. 16 is an illustration of a chicken growing and house cleaning sequence for the combined external nursery and chicken house pair shown in FIG. 15.

Turning now to FIGS. 15 and 16, it is also contemplated as part of the present invention that an external brooding house or nursery 180 be utilized with a pair of chicken houses 182 and 183. The nursery 180 would be provided with a similar ventilated floor assembly 16 or 98 as previously described and related fans, blowers, ducts, air plenums, etc. Preferably, the single nursery 180 and two chicken houses 182 and 183 would be arranged in the shape of the letter "H", as shown in FIG. 15. The nursery 180 is connected at each end 184 at approximately the center of each chicken house 182 and 183. Preferably, however, the nursery 180 would be environmentally separated from the chicken houses 182 and 183 by end walls or doors which could be opened or raised to allow the chicks to migrate from the nursery 180 into a respective one of the chicken houses 182 or 183 when they have completed their first growth period, as described previously, and are ready to complete their growth, i.e., the second and third growth phases as described previously, in a chicken house.

The nursery 180 and its related blowers, air plenums and ventilated floor assembly are operated as previously described in connection with the first growth period comprising the first two weeks of growth. A sequence for utilizing the separate nursery 180 and the two chicken houses 182 and 183, in accordance with the present invention, is illustrated in FIG. 16 and will be described in the following paragraphs.

Initially, on day 1, a first flock of one-day old chicks enter the center of the nursery as shown at 180 in FIG. 15. At the end of the first two week (or 14 day) growth cycle 190, the chicks are transferred to the main chicken house 182 for the remainder of their growth, i.e., 38 days, 200, as indicated by arrow 192. Once the chicks have been transferred from the nursery 180 to chicken house 182 after the initial 14 day period, there is a seven day period 194 for cleaning and preparing the nursery. Thereafter, the next flock of baby chicks is introduced into the nursery 180 for their 14 day growth period 196. At the conclusion of growth period 196, now totaling 35 days, the second flock of chicks is transferred to the other chicken house 183 for their final 38 days of growth 202, as indicated by arrow 198.

The nursery 180 then has another seven days 204 within which to prepare for another (third) flock of baby chicks. During the 14 day growth period 206 for this third flock, the first flock transferred to chicken house 182 has fully matured during its 38 day growth cycle 202 (a total of 52 days) and are removed from chicken house 182. The chicken house operator then has four days 208 to clean and prepare chicken house 182 before the third flock of chicks is ready to be transferred from nursery 180. At this point, 63 days from startup, the third flock of chicks is transferred to chicken house 182 for the beginning of their 38 day growth period, 210, as indicated by arrow 212. The nursery 180 then has another seven days 214 for cleanup and preparation for receiving another (fourth) flock of baby chicks for their 14 day growth period 216 in the nursery 180.

During this time, the 38 day growth period 202 for the second flock of chicks in chicken house 183 has been completed, and the chickens removed. The operator then has four days 218 to clean and prepare chicken house 183 for the next (fourth) flock of chicks from the nursery 180. Thus, after 77 days from startup, the fourth flock of chicks are ready for transfer to chicken house 183 to commence their 38 days of growth 220, as indicated by arrow 222. The nursery 180 then has another seven days 224 for cleaning and preparation for the next (fifth) flock of baby chicks. The process is repeated for each 21 day cycle for the nursery 180, 14 days for chick growth and seven days for cleanup, and 42 days for each chicken house 182 and 183, 38 days of growth and four days of cleanup. These time periods can vary somewhat, although it is believed that the chicken houses 182 and 183 can be cleaned and prepared in four days if constructed and equipped in accordance with the present invention. Further, each growth and cleanup cycle in chicken houses 182 and 183 (42 days as described) should preferably be twice as long as the growth and cleanup cycle for the nursery 180 (21 days as described).

By thus coordinating the schedule of production of the nursery 180 and chicken houses 182 and 183, the nursery can supply two week old chicks in alternating cycles to the houses 182 and 183 while allowing all three buildings proper clean out time. Such coordinated growth schedules can increase production by almost double that of two single chicken houses operating independently, as well as reduce early mortality to the baby chicks caused by contamination, temperature, and stress if raised from the start in the chicken house without a separate nursery or brooding area.

While the present invention has been described specifically for chicken houses and chicken growth or grow out facilities, those skilled in the art will recognize that the present invention may also be applicable to other fowl, including but not limited to quail, turkeys, duck, pullets and breeders.

Modifications and variations of the above-described structures and methods will undoubtedly occur to those of skill in the art. It is therefore to be understood that the following claims define the scope of the invention and the invention may be practiced otherwise than is specifically described while falling within the scope of the claims.

What is claimed:

1. A fowl growing facility comprising a closed growth chamber including walls, roof, a ventilated floor including a plurality of ventilated modular floor sections arranged side-by-side with each floor section having a plurality of holes therein that form flow passages that are of a size no greater than about ⅛ inch in largest dimension to permit air and moisture to pass therethrough while precluding passage of solid manure, a bottom plenum including a plurality of bottom floor modules positioned beneath the ventilated floor, each of said bottom floor modules having a base component and at least one spacer thereon that extends upwardly to support at least one of said ventilated floor sections in a spaced relationship to form an interlocked unitary structure therewith, and air moving blowers creating an air pressure differential between the growth chamber and the plenum sufficient to cause air to flow from the growth chamber through the ventilated floor and any manure thereon into the plenum so as to effect drying of the manure on top of the ventilated floor and a resultant reduction of ammonia production in the manure.

2. The fowl growing facility as recited in claim 1, wherein the air pressure differential between the growth chamber and the plenum is created at least in part by plural blowers blowing ambient air into the growth chamber.

3. The fowl growing facility as recited in claim 1, wherein the air pressure differential between the growth chamber and the plenum is created at least in part by a suction device creating a partial vacuum in the plenum.

4. The fowl growing facility as recited in claim 1, wherein said base components of said plurality of bottom floor modules are substantially flat with a rectangular plan shape and said ventilated modular floor sections have a rectangular plan shape substantially the same as said rectangular flat base components.

5. The fowl growing facility as recited in claim 4, wherein the rectangular flat base of said modules and the rectangular ventilated floor sections are both square.

6. The fowl growing facility as recited in claim 4, wherein said flat base component of said modules includes interlocking connections along their sides so that when laid side-by-side they form an interlocked liquid and vapor barrier covering a ground surface under said bottom plenum.

7. The fowl growing facility as recited in claim 4, wherein said ventilated floor includes a plurality of rectangular ventilated floor sections which are staggered when assembled with said rectangular modules.

8. The fowl growing facility as recited in claim 1, wherein said spacers have openings at a top upper surface and said ventilated floor sections have depending projections which frictionally fit in said spacer openings to interconnect said ventilated floor sections to said spacers.

9. The fowl growing facility as recited in claim 8, wherein said spacers are cone-shaped, hollow and open at their bottom and said ventilated floor sections are without flow passages at locations of said projections such that the insertion of said projections in said spacer top surface openings seals said spacers.

10. The fowl growing facility as recited in claim 1, wherein said bottom floor modules and said ventilated floor sections are made of injection molded polymeric material.

11. The fowl growing facility as recited in claim 1, wherein said growing facility includes an air plenum under said roof, at least one blower having an inlet communicating with said open air plenum, and a conduit tube operatively connected to said blower and extending to said ventilated floor in order to direct warm air from said roof air plenum into said bottom plenum.

12. The fowl growing facility as recited in claim 1, wherein said polygonal plan shape of said modular floor sections is rectangular.

13. A fowl growing facility comprising a closed growth chamber having walls, a roof and a ventilated floor assembly, said ventilated floor assembly including an upper ventilated floor having a plurality of holes extending therethrough and a bottom air plenum extending beneath said ventilated floor, the holes in said ventilated floor sized to permit air and moisture to pass through said ventilated floor but prevent solid manure from passing through said ventilated floor to retain the manure in the growth chamber on an upper surface of the ventilated floor, said ventilated floor extending substantially completely under said growth chamber and supported over a ground surface underneath said growth chamber to form said bottom air plenum, air in said growth chamber and in said bottom air plenum operative to dry said solid manure retained on the upper surface of the ventilated floor and other fluids excreted by growing chicks in said growth chamber to substantially reduce or eliminate the production of ammonia by said manure in said fowl growing facility.

14. The fowl growing facility as recited in claim 13, wherein said ventilated floor assembly further includes a plurality of bottom floor modules having a flat base component with a polygonal plan shape and a plurality of upstanding spacers and said ventilated floor includes a plurality of ventilated floor sections each having a polygonal plan shape substantially the same as said polygonal plan shape of said flat base component.

15. The fowl growing facility as recited in claim 14, wherein said polygonal plan shapes of said bottom floor module base components and said ventilated floor sections are rectangular.

16. The fowl growing facility as recited in claim 14, wherein the plurality of upstanding spacers extending from the flat base components of the bottom floor modules define the bottom air plenum between said flat bottom base components and said ventilated floor sections of the ventilated floor.

17. The fowl growing facility as recited in claim 13, wherein the holes in said ventilated floor have a largest dimension of no more than about ⅛ inch.

18. The fowl growing facility as recited in claim 13, further comprising a liquid and vapor barrier positioned below said bottom air plenum that substantially completely covers said ground surface.

19. The fowl growing facility as recited in claim 13, further comprising at least one air moving blower creating an air pressure differential between the growth chamber and the bottom air plenum sufficient to cause air to flow from the growth chamber through the ventilated floor and any manure thereon and into the bottom air plenum.

20. A ventilated floor assembly for inclusion in or retrofitting a fowl growing facility which comprises a ventilated floor for being positioned below a closed growth chamber, said ventilated floor including a plurality of ventilated modular floor sections each having a polygonal plan shape with flow passages that are of a size to permit air and moisture to pass therethrough while small enough to preclude passage of solid manure, each floor section having a plurality of downwardly depending projections, and a bottom plenum underneath said ventilated floor that includes a plurality of bottom floor modules each having a base component with a polygonal plan shape and a plurality of spacers thereon that are integral with said base component and extend upwardly therefrom to support at least one of said modular floor sections in a spaced relationship, said downwardly depending projections being respectively received within each of said spacers with a snap-fit to form an interlocked unitary structure therewith that ensures a seal from underneath said floor assembly to prevent intrusion of darkling beetles into the plenum or the growth chamber.

21. The ventilated floor assembly as recited in claim 20, wherein said polygonal plan shapes of said base components and said floor sections are substantially the same.

22. The ventilated floor assembly as recited in claim 21, wherein said polygonal plan shapes are rectangular.

23. A method of reducing ammonia in a fowl growth chamber that includes a closed growth chamber having walls, roof, a ventilated floor having a plurality of ventilated modular floor sections arranged side-by-side, a bottom air plenum extending beneath the ventilated floor and at least one air moving blower operative to move air in said growth chamber, said method including the steps of:
(a) providing the ventilated floor in the fowl growth chamber for supporting the fowl, said ventilated floor having flow passages of sufficient dimensions to permit flow of air and moisture through the floor while concurrently precluding passage through the floor of solid manure deposited on the upper surface of the floor; and
(b) creating an air flow using said at least one air moving blower to effect drying of the solid manure on the upper surface of the floor while substantially decreasing production of ammonia by the solid manure in the fowl growth chamber.

24. The method of claim 23, wherein the air flow is created at least in part by the blowing of pressurized ambient air into the growth chamber.

25. The method of claim 23, wherein a pressure differential is created between the fowl growth chamber and the bottom air plenum at least in part by creation of sub-atmospheric pressure in the plenum beneath the ventilated floor.

26. A fowl growing facility comprising:
a closed growth chamber including walls, a roof and a floor assembly;
said floor assembly including,
a ventilated floor having flow passages that are of a size to permit air and moisture to pass therethrough while precluding passage of manure; and
a bottom air plenum beneath the ventilated floor;
said floor assembly formed from a plurality of modules, each of said modules including a ventilated floor section having a polygonal plan shape and a solid base component having a plurality of spacers integral with said base component, said spacers spacing said ventilated floor section vertically above said base component to define said plenum, each of said spacers having openings at a top upper surface and said ventilated floor sections having depending projections which fit within each respective spacer opening to interlock within all said spacers and form said floor assembly as a rigid interlocked unitary structure.

27. The fowl growing facility as recited in claim 26, wherein said base components interlock with one another to strengthen said floor assembly as a rigid interlocked unitary structure over said ground surface.

28. The fowl growing facility as recited in claim 26, wherein said base component has a polygonal plan shape substantially the same as the polygonal plan shape of said ventilated floor section.

29. The fowl growing facility as recited in claim 28, wherein said polygonal plan shapes are rectangular.

30. The fowl growing facility as recited in claim 28, wherein said base component is substantially flat and generally parallel with said ventilated floor section.

31. The fowl growing facility as recited in claim 26, wherein said spacers are cone-shaped, hollow and open at their bottom and said ventilated floor sections are without flow passages at locations of said projections such that the insertion of said projections in said spacer top surface openings seals said spacers.

32. The fowl growing facility as recited in claim 26, wherein said flow passages include a plurality of holes extending through said ventilated floor, a largest dimension of said holes being no more than about ⅛ inch.

* * * * *